US011128673B2

(12) United States Patent
Russell et al.

(10) Patent No.: US 11,128,673 B2
(45) Date of Patent: Sep. 21, 2021

(54) METHOD AND SYSTEM FOR ACCESS AND USE OF MULTIPLE ISIM OR ISIM CREDENTIALS

(71) Applicant: BlackBerry Limited, Waterloo (CA)

(72) Inventors: Nicholas James Russell, Newbury (GB); Adrian Buckley, Tracy, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/669,656

(22) Filed: Aug. 4, 2017

(65) Prior Publication Data

US 2019/0044980 A1 Feb. 7, 2019

(51) Int. Cl.
| | |
|---|---|
| *H04L 29/06* | (2006.01) |
| *H04W 12/06* | (2021.01) |
| *H04W 8/06* | (2009.01) |
| *H04W 8/18* | (2009.01) |
| *H04W 4/10* | (2009.01) |
| *H04W 8/12* | (2009.01) |
| *H04W 12/45* | (2021.01) |
| *H04L 29/12* | (2006.01) |

(52) U.S. Cl.
CPC ...... *H04L 65/1016* (2013.01); *H04L 65/1073* (2013.01); *H04L 65/4061* (2013.01); *H04W 8/06* (2013.01); *H04W 12/06* (2013.01); *H04L 61/3075* (2013.01); *H04L 61/35* (2013.01); *H04W 4/10* (2013.01); *H04W 8/12* (2013.01); *H04W 8/183* (2013.01); *H04W 12/45* (2021.01)

(58) Field of Classification Search
CPC ........... H04L 65/1016; H04L 12/00; H04L 29/06068; H04L 51/04; H04L 63/0853; H04L 65/1069; H04L 65/1006; H04L 65/1073; H04L 29/06217; H04L 29/06224; H04L 61/1588

See application file for complete search history.

(56) References Cited

U.S. PATENT DOCUMENTS

| | | | |
|---|---|---|---|
| 9,363,845 B1 * | 6/2016 | Sahoo | H04L 5/001 |
| 9,516,620 B1 * | 12/2016 | Upp | H04L 65/1016 |
| 2011/0265158 A1 * | 10/2011 | Cha | G06F 21/57 |
| | | | 726/6 |
| 2014/0220952 A1 * | 8/2014 | Holtmanns | H04W 8/183 |
| | | | 455/418 |

(Continued)

FOREIGN PATENT DOCUMENTS

| | | |
|---|---|---|
| EP | 2469898 | 6/2016 |
| WO | 2009141919 | 11/2009 |

(Continued)

OTHER PUBLICATIONS

3GPP TS 33.401 v.15.0.0, "3GPP System Architecture Evolution (SAE); Security architecture" Jun. 14, 2017.

(Continued)

*Primary Examiner* — Asad M Nawaz
*Assistant Examiner* — Najeeb Ansari
(74) *Attorney, Agent, or Firm* — Fish & Richardson P.C.

(57) ABSTRACT

A method at a mobile entity for enabling use of multiple Internet Protocol (IP) Multimedia Services (IMS), the method including reading data from a plurality of IMS Subscriber Identity Modules (ISIMs) associated with the mobile entity; storing the data at the mobile entity; and binding a function at the mobile entity to one of the plurality of ISIMs.

13 Claims, 14 Drawing Sheets

(56) References Cited

U.S. PATENT DOCUMENTS

| | | | |
|---|---|---|---|
| 2016/0150052 A1* | 5/2016 | Salmela | H04W 4/70 709/228 |
| 2016/0192430 A1* | 6/2016 | Sahoo | H04L 5/001 455/422.1 |
| 2016/0316355 A1* | 10/2016 | Brooks | H04W 12/08 |
| 2016/0366567 A1* | 12/2016 | Lee | H04W 4/10 |
| 2017/0041768 A1* | 2/2017 | Pattan | H04W 4/10 |
| 2018/0124604 A1* | 5/2018 | Rajadurai | H04L 29/06 |
| 2018/0227383 A1* | 8/2018 | Vasanthasenan | H04W 76/10 |
| 2018/0295556 A1* | 10/2018 | Baek | H04W 40/22 |
| 2018/0368099 A1* | 12/2018 | Chen | H04W 68/02 |
| 2019/0069193 A1* | 2/2019 | Astrom | H04W 28/0205 |

FOREIGN PATENT DOCUMENTS

| | | |
|---|---|---|
| WO | 2012054030 | 4/2012 |
| WO | 2016167553 | 10/2016 |

OTHER PUBLICATIONS

3GPP TS 23.060 v.14.4.0, "General Packet Radio Service (GPRS); Service Description; Stage 2", Jun. 12, 2017.
3GPP TS 23.203 v.14.4.0, "Policy and charging control architectures", Jun. 12, 2017.
3GPP TS 23.401 v.15.0.0, "General Packet Radio Service (GPRS) enhancements for Evolved Universal Terrestrial Radio Access Network (E-UTRAN) access", Jun. 12, 2017.
3GPP TS 23.002 v.14.1.0, "Network Architecture", Mar. 13, 2017.
3GPP TS 23.228 v.14.4.0, "IP Multimedia Subsystem (IMS); Stage 2", Jun. 12, 2017.
3GPP TS 31.103 v.14.2.0, "Characteristics of the IP Multimedia Services Identity Module (ISIM) application", Jun. 16, 2017.
3GPP TS 33.180 v.14.0.0, "Security of the mission critical service", Jun. 15, 2017.
3GPP TS 23.280 v.15.0.0, "Common functional architecture to support mission critical services; Stage 2", Jun. 16, 2017.
3GPP TS 33.203 v.14.0.0, "3G security; Access security for IP-based services", Mar. 27, 2017.
3GPP TS 23.502 v.0.5.0, "Procedures for the 5G System", Jul. 14, 2017.
3GPP TS 31.101 v.14.1.0, "UICC-terminal interface; Physical and logical characteristics", Mar. 17, 2017.
3GPP TS 23.501 v.1.2.0, "System Architecture for the 5G System", Jul. 26, 2017.
3GPP TS 31.102 v.14.2.0, "Characteristics of the Universal Subscriber Identity Module (USIM) application", Mar. 17, 2017.
3GPP TS 38.300 v.0.4.1, "NR; Overall description; Stage—2", Jun. 12, 2017.
IETF RFC 6749, "The OAuth 2.0 Authorization Framework", Oct. 2012.
IETF RFC 7523, "JSON Web Token (JWT) Profile for OAuth 2.0 Client Authentication and Authorization Grants", May 2015.
IETF RFC 6750, "The OAuth 2.0 Authorization Framework: Bearer Token Usage", Oct. 2012.
3GPP TS 23.003 v.15.0.0, "Numbering, addressing and identification", Jun. 19, 2017.
GSMA PRD IR.92, "IMS Profile for Voice and SMS Version 9.0", Apr. 8, 2015.
GSMA PRD IR.88, "LTE and EPC Roaming Guidelines Version 15.0", Nov. 3, 2016.
ETSI TS 102 221 v14.0.0, "Smart Cards; UICC-Terminal interface; Physical and logical characteristics (Release 14)", Feb. 2017.
ETSI TS 101 220 v12.0.0, "Smart Cards; ETSI numbering system for telecommunication application providers (Release 12)", Oct. 2013.
GSMA NG.102, "IMS Profile for Converged IP Communications Version 3.0", May 17, 2016.
GSMA RCC.15, "IMS Device Configuration and Supporting Services Version 4.0", Jun. 28, 2017.
GSMA IR.94, "IMS Profile for Conversational Video Service Version 10.0", Oct. 22, 2015.
GSMA IR.51, "IMS Profile for Voice, Video and SMS over untrusted Wi-Fi access Version 5.0", May 23, 2017.
GSMA NG.106, "IMS profile for Video, Voice and SMS over trusted Wi-Fi access Version 2.0", May 24, 2017.
3GPP C6-160103 TSG-CT WG6 Meeting #79, "USIM application dedicated for IOPS", Feb. 2016.
ISO/IEC FDIS 7816-4:2012, "Identification cards—Integrated circuit cards—Part 4: Organization, security and commands for interchange", Draft International Standard 2012.
JSON Web Token (JWT), https://www.iana.org/assignments/jwt/jwt.xhtml, Jan. 23, 2015.
openid.net, "OpenID Connect Basic Client Implementer's Guide 1.0—draft 37", http://openid.net/specs/openid-connect-basic-1_0.html#RFC6749, Aug. 3, 2015.
International Search Report and Written Opinion issued in International Application No. PCT/US2018/043905 dated Sep. 27, 2018; 13 pages.
3rd Generation Partnership Project; Technical Specification Group Services and System Aspects; Security of the Mission Critical Service (Release 14) 3GPP Standard; Technical Specification; 3GPP TS 33.180; France; Jun. 16, 2017.
PCT International Preliminary Report on Patentability in International Application No. PCT/US2018/043,905, dated Feb. 13, 2020, 8 pages.
Communication Pursuant to Article 94 (3) EPC issued in European Application No. 18759441.1 dated Jan. 22, 2021, 5 pages.

* cited by examiner

METHOD AND SYSTEM FOR ACCESS AND USE OF MULTIPLE ISIM OR ISIM CREDENTIALS

FIELD OF THE DISCLOSURE

The present disclosure relates to Internet Protocol (IP) Multimedia Subsystem (IMS) services, and in particular to use of an IMS Subscriber Identity Module (ISIM) for access to IMS services.

BACKGROUND

The IP Multimedia subsystem is a framework used to deliver IP multimedia services to devices. It uses packet switched networks rather than circuit switched networks.

The ISIM is an application that typically resides on a universal integrated circuit card associated with a device. The ISIM provides only a single set of IMS credential information, consequently resulting in a user equipment (UE) being able to utilize the ISIM for connections to only a single IMS.

Previously the Third Generation Partnership Project (3GPP) assumed that only a single IMS would need to be connected to by a UE, where that single IMS was provided by the UE's Home Public Land Mobile Network (HPLMN) and the different services in the IMS would be provided via Application Servers located within the IMS core network or located externally to the IMS and connected in via an interface or reference point.

However, a UE may need to connect to multiple IMS services using certain data only available in an ISIM (e.g. security credentials, identities, etc) to obtain different IMS-based services. For example, one IMS may be needed for Voice over Long Term Evolution (LTE) access (VoLTE), another IMS may be needed for Mission Critical Push to Talk (MCPTT), and another IMS may be needed for Rich Communication Services (RCS).

In some instances, e.g. a roaming scenario where the UE is connected to a Visited PLMN (VPLMN), the VPLMN's IMS can provide some access for the UE to connect back to the UE's HPLMN IMS. However, access to the VPLMN's IMS is based on the authentication and authorization by the HPLMN's IMS, which utilizes the ISIM belonging to the HPLMN in the UE.

BRIEF DESCRIPTION OF THE DRAWINGS

The present disclosure will be better understood with reference to the drawings, in which.

DETAILED DESCRIPTION OF THE DRAWINGS

Figure 1:
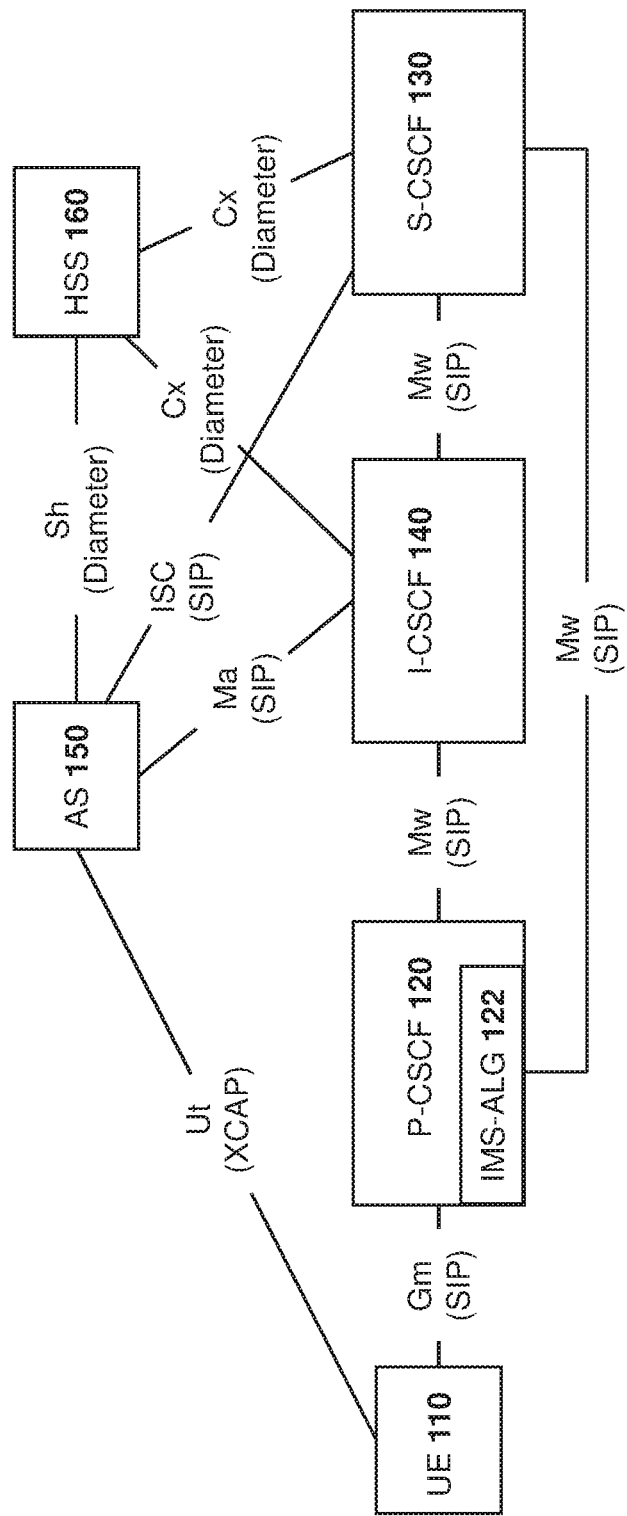
FIG. 1 is a block diagram showing a basic IMS functional architecture.

The present disclosure provides a method at a mobile entity for enabling use of multiple Internet Protocol (IP) Multimedia Services (IMS), the method comprising: reading data from a plurality of IMS Subscriber Identity Modules (ISIMs) associated with the mobile entity; storing the data at the mobile entity; and binding a function at the mobile entity to one of the plurality of ISIMs.

The present disclosure further provides a mobile entity for enabling use of multiple Internet Protocol (IP) Multimedia Services (IMS), the mobile entity comprising: a processor; and a communications subsystem, wherein the mobile entity is configured to: read data from a plurality of IMS Subscriber Identity Modules (ISIMs) associated with the mobile entity; store the data at the mobile entity; and bind a function at the mobile entity to one of the plurality of ISIMs.

The present disclosure further provides a computer readable medium for storing instruction code for enabling use of multiple Internet Protocol (IP) Multimedia Services (IMS), which, when executed by a processor of a mobile entity cause the mobile entity to: read data from a plurality of IMS Subscriber Identity Modules (ISIMs) associated with the mobile entity; store the data at the mobile entity; and bind a function at the mobile entity to one of the plurality of ISIMs.

A UE may need to connect to multiple IMS services using certain data only available in an ISIM (e.g. security credentials, identities, etc) to obtain different IMS-based services. IMS-based services and initiatives show that IMSs not belonging to a UE's HPLMN are being deployed. For example, for Mission Critical (MC) services such as MCPTT, MC video, or MC data, the IMS providing MC services (sometimes also referred to as MCX service(s)) could be hosted by a Mission Critical Service Provider rather than the UE's HPLMN.

Further, for RCS many PLMN operators in the industry are outsourcing their RCS hosting to an external entity or 3$^{rd}$ party provider, which includes an IMS not provided for by the UE's HPLMN.

For VoLTE, the same outsourcing possibility as for RCS exists. However, PLMN operators may host the IMS for VoLTE themselves, for example due to use of common infrastructure for both VoLTE and CS calling.

Other IMS services could also use an IMS not belonging to a UE's HPLMN. Thus, the above examples alone should not be seen as an exhaustive list of industry IMS-based services. Other combinations or derivatives of the above, as well as other current and future IMS-based services may require a UE to connect to separate IMSs for different services.

Therefore, in accordance with one embodiment of the present disclosure, the UE is provided access to multiple instances of an ISIM (which may, but need not, reside on a UICC) and chooses which ISIM to use to authenticate to different IMSs based on an indication of which service(s) or application(s) the ISIM is associated with.

In accordance with other embodiments of the present disclosure, a single ISIM may have multiple credentials for authentication to multiple IMSs.

In the Figures below, communication flows are shown between functions. However, those skilled in the art will appreciate that the communication flows may in some cases proceed through intermediate entities or logical functions that are not shown.

In the present disclosure, the following terms have at least the meaning provided in Table 1 below.

TABLE 1

| Term | Definition |
|---|---|
| GSM Association (GSMA) | An industry forum for mobile communications companies. |
| IMS credential information | A set of data enabling a Session Initiation Protocol (SIP) User Agent (UA) (e.g. a User Equipment) to connect to and authenticate to an IMS |
| Isolated Operations (IOPS) | Where an evolved Node B (eNB) loses connectivity with the rest of the core network and the eNB then changes its characteristics to become a complete isolated network |
| JavaScript Object Notation (JSON) Web token | JSON Web Token (JWT) is a compact, Uniform Resource Locator (URL)-safe means of representing claims to be transferred between two parties |
| Open Mobile Alliance (OMA) | A standards development organisation. |
| Permanent Reference Document (PRD) | A type of document produced by the GSMA. |
| Rich Communication Services (RCS) | A suite of services defined by GSMA e.g. in GSMA PRD RCC.07 (plus other documents). |
| User Equipment (UE) | A device consisting of a least a mobile entity (ME) and optionally also a Universal Integrated Circuit Card (UICC), where the UICC contains at least an ISIM and optionally also one of a Subscriber Identity Module (SIM) or Universal Subscriber Identity Module (USIM). Could utilise wireless and/or fixed communications accesses. |
| Universal Integrated Circuit Card (UICC) | A physical entity that may be removable or non-removable (also known as an "embedded UICC") that hosts secure applications such as an ISIM, USIM, SIM, etc. Sometimes this is referred to as a "SIM card". |
| Video over Long Term Evolution (LTE) (ViLTE) | Implies video over IP (e.g. using IMS) over 4G/LTE radio network, and generally refers to the profile defined and maintained by the GSM Association in GSMA PRD IR.94. Support of VoLTE is generally required when ViLTE is supported in any device and/or network deployment. |

TABLE 1-continued

| Term | Definition |
|---|---|
| Voice over High Speed Packet Access (HSPA) (VoHSPA) | Implies voice over IP (e.g. using IMS) over Voice over Universal Mobile Telecommunications System (UMTS) High-Speed Packet Access network, and generally refers to the profile defined and maintained by the GSM Association in GSMA PRD IR.58. |
| Voice over LTE (VoLTE) | Implies voice over IP (e.g. using IMS) over 4G/LTE radio network, and generally refers to the profile defined and maintained by the GSM Association in GSMA PRD IR.92. Use of this term may, but need not, also imply support of ViLTE, VoWiFi, VoHSPA and/or USSI |
| Voice over WiFi (VoWiFi) | Implies voice and optionally video over IP (e.g. using IMS) over a Wireless Local Area Network (WLAN) (e.g. utilising a tunnel to an operator's EPC, utilising direct access to an operator's EPC via a trusted access WLAN), and generally refers to one or both of the profiles defined and maintained by the GSM Association in GSMA PRD IR.51 and GSMA PRD NG.106. |
| Unstructured Supplementary Service Data (USSD) Simulation Service in IMS (USSI) | Implies USSD messaging over IP (e.g. using IMS) over a packet switched network e.g. LTE, HSPA, 5G, etc. It may, but need not, refer to the profile defined and maintained by the GSM Association in GSMA PRD NG.101 |
| Identity | Could be a public user identity or a private user identity. Could be an identity of the device or combination of all. The identity could be wild carded. |
| Network | 1 or many network nodes e.g. Network Node 1, Network Node 2, etc. |
| Public User ID/IMPU (IP Multimedia Public User ID) | Could be but not limited to: an MSISDN, email address, SIP URI, Tel URI, mission critical (MC) Service ID. The property of this identity is that it is known to the public and can be used as a means for addressing calls/session. |
| Private user ID/IMPI (IP Multimedia Private user ID) | IMSI, SIP URI The property of this identity is that it cannot be used as a means of addressing for calls/sessions, and is generally only known to the network and the device. |
| User Identity | Can be either or both Public User ID and Private user ID. The identity could be wild carded |

IMS

Reference is now made to FIG. 1, which shows an overview of an IP multimedia (core network) subsystem. An IMS network can, but need not, be attached to a fourth-generation (4G) network, a fifth-generation (5G) network, or a WLAN, and may consist of a number of functional elements, a subset of which are described with regard to FIG. 1.

In particular, UE 110 may communicate with a Proxy-Call Session Control Function (P-CSCF) 120. P-CSCF 120 is the first point of entry into the IMS network. The P-CSCF 120 may include an IMS Application Level Gateway (IMS-ALG) 122.

Communications between UE 110 and P-CSCF 120 are done utilizing a Gm interface, which is used to exchange messages between SIP UEs or Voice Over Internet Protocol (VOIP) gateways and the P-CSCF 120. Messages are exchanged utilizing SIP.

A Serving-Call Session Control Function (S-CSCF) 130 handles sessions in the network and routes SIP messages to appropriate IMS application servers (AS) and P-CSCFs.

S-CSCF 130 communicates with the P-CSCF using an Mw interface, which is used to exchange messages between CSCFs. Messages are exchanged utilizing SIP.

An Interrogating-Call Session Control Function (I-CSCF) 140 is used as an entry point to find a subscriber in the network and assist in assigning an S-CSCF 130 when a subscriber registers in the network. I-CSCF 140 communicates with both the P-CSCF 120 and the S-CSCF 130 utilizing an Mw interface and SIP.

AS 150 typically provides service specific functionality. An example of an AS may include a telephony application server, which is typically used to provide service logic and control for telephony services such as voice/audio or video. Another example of an AS may be a service centralization and continuity AS, which is typically used to provide service logic and control for centralizing services between circuit-switched (CS) and IMS in the IMS and handing over of SIP sessions and their associated media between UEs and/or across different IP networks.

In one embodiment, AS 150 may be the IMS application server. Such IMS application server has the logic and software that executes services for an IMS subscriber. There may be 0 to many such application servers in a network.

AS 150 communicates with UE 110 utilizing a Ut interface over an eXtensible Markup Language (XML) Configuration Access (XCAP) protocol. AS 150 further communicates with I-CSCF 140 over an Ma interface using SIP. AS 150 further communicates with the S-CSCF 130 using the ISC interface and SIP.

The Home Subscriber Server (HSS) 160 provides a $1^{st}$ database that contains the subscriber profile, including identities and what services have been subscribed to, and provides location functionality as well as an authentication/authorization database ($2^{nd}$ database). HSS 160 communicates with the I-CSCF 140 utilizing a Cx interface and the Diameter protocol. Similarly, HSS 160 communicates with the S-CSCF 130 utilizing the Cx interface and the Diameter protocol. Note that from an implementation perspective, these two databases may be one or two physical entities.

HSS 160 further communicates with AS 150 utilizing the Sh interface and the Diameter protocol.

A more complete description of the functionality of the elements above can be found in the 3GPP Technical Specification (TS) 23.002, *"Network Architecture"*, as for example provided in v. 14.1.0, March 2017, and TS 23.228, *"IP Multimedia Subsystem (IMS); Stage 2"*, as for example provided in v. 14.4.0, June 2017.

An IMS registration is needed in order for a subscriber and their UE to be able to use the IMS based services. An IMS registration procedure is described, for example, in 3GPP TS 23.228. Specifically, subclause 5.2.2.3 provides for IMS registration and is described below with regard to FIG. 2.

Figure 2:
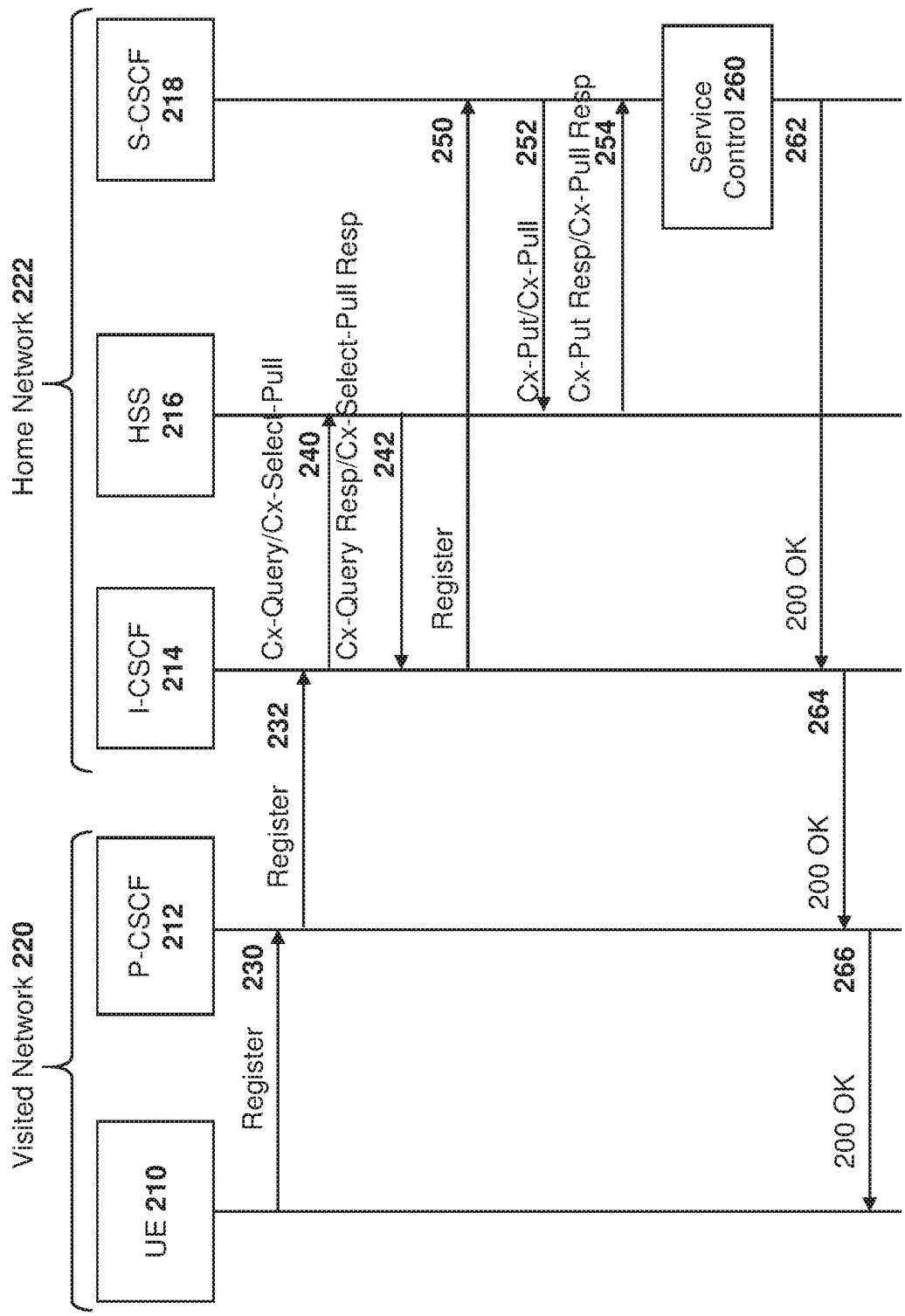
FIG. 2 is a dataflow diagram showing a basic IMS registration procedure.

As seen in FIG. 2, UE 210 is in a visited network 220. UE 210 communicates with the P-CSCF 212 of the visited network 220.

Further, a home network 222 includes I-CSCF 214 as well as HSS 216 and S-CSCF 218.

The registration procedure includes the UE 210 sending a register message 230 to P-CSCF 212. The registration message is then forwarded in message 232 to the I-CSCF 214.

Based on received message 232, I-CSCF 214 sends a CX-query/CX-select-pull message 240 to HSS 216 and receives, in response, a CX-query Response (Resp)/CX-select-pull Resp message 242.

Based on message 242, I-CSCF 214 may send a registration message 250 to the S-CSCF 218.

The S-CSCF 218, in response to message 250, sends a CX-put/CX-pull message 252 to HSS 216 and receives, in response to message 252, a CX-put Resp/CX-pull Resp message 254.

S-CSCF 218 may then perform service control (e.g. contact application servers), as shown at block 260, and provide a "200 OK" message 262 back to I-CSCF 214.

I-CSCF 214 then forwards the 200 OK message to the P-CSCF 212 as message 264. P-CSCF 212 then forwards the 200 OK message as message 266 back to UE 210. The 200 OK message 266 indicates to UE 210 that it has successfully registered for IMS services.

Once the UE 210 has registered with the network, it is then able to receive and send further SIP requests/messages.

While the example of FIG. 2 shows the UE 210 and P-CSCF 212 in a visited network 220, in other embodiments the UE 210 could be in the VPLMN while the P-CSCF 212 is in the HPLMN. In still further embodiments, both the UE 210 and P-CSCF 212 could be in the HPLMN. Therefore, the embodiment of FIG. 2 is merely one example configuration.

IMS-Based Services

IMS-based services may include a variety of services. Examples include VoLTE/ViLTE/VoWiFi and Rich Communication Services (RCS). Each is described below.

For VoLTE/ViLTE/VoWiFi, these are all services provided by a mobile or cellular carrier or operator to their subscribers. VoLTE may include voice and SMS over LTE. ViLTE includes video over LTE and VoWiFi includes voice, SMS and video over Wi-Fi.

In some scenarios, these services are deployed to supplement, complement or replace equivalent services over circuit-switched access. For example, since there are no circuit switched services on LTE/Evolved-Universal Terrestrial Radio Access Network (E-UTRAN)/fourth-generation (4G) access, then VoLTE may be deployed as a solution for providing voice services on this access.

The GSMA has produced profiles of the Third Generation Partnership Project (3GPP) standards for the aforementioned services in various documents.

All of VoLTE, ViLTE and VoWiFi utilize an IMS, with the exception of SMS which may utilize an IMS or may utilize non-access stratum (NAS) signaling. Typically, but not in all circumstances, cellular carriers offer such services using their own IMS. However, in some cases an IMS belonging to another company or outsourced company may be used.

With regards to Rich Communication Services, RCS is a suite of services provided by a mobile cellular carrier or operator to their subscribers that includes such services as best effort voice over IP, Chat/instant messaging, file transfer, video share, among other services. RCS has gone through many iterations, a recent iteration known as RCS Universal Profile. For example, an extract from the GSMA describing Universal profile is provided in Table 2 below.

TABLE 2

Extract from GSMA on Universal profile

The Universal Profile (UP) is an industry-agreed common set of features and technical enablers for Advanced Communications. The Universal Profile has been developed to deliver a richer, common user experience globally, and simplify both product development and operator deployment of Advanced Messaging. This will provide the scale needed to develop Messaging as a platform.

TABLE 2-continued

Extract from GSMA on Universal profile

Release 1 (available now) - This includes core features such as capability discovery which will be interoperable between regions, chat, group chat, file transfer, audio messaging, video share, multi-device, enriched calling, location share and live sketching.

RCS utilizes an IMS. Cellular carriers offer these services using either their own IMS or an IMS belonging to another company. If the cellular carrier offers the services using their own IMS, the IMS may be the same IMS as used for VoLTE/ViLTE/VoWiFi.

Mission Critical Services

In 3GPP, multiple 3GPP Mission Critical (MC) services are defined. These include, but are not limited to. Mission Critical Push-To-Talk (MCPTT), Mission Critical Video (MCVideo), Mission Critical Data (MCData), among other options. As used herein, the term MCX is used to denote one or a plurality of generic mission critical services. Further, as used herein, the following terms may be used interchangeably:

MCX UE/MC UE/MC service UE
MCX client/MC client/MC service client
MCX user/MC user/MC service user
MCX domain/MC domain
MCX service/MC service
MCX system/MC system MC services are a 3GPP global initiative to support such functionality as push-to-talk functionality (MCPTT e.g. a "walkie-talkie" like service), video sharing and access to videos stored in the network (MCVideo), and for MCData the sending/receiving of Short Data Service (SDS) messaging and File Delivery (FD) amongst other services. Currently, MC services are defined to run over LTE networks, and are typically for organizations including government agencies such as security, police, fire and rescue services, as well as commercial organizations such as utility and transportation companies. MC service signaling (e.g. call signaling, session signaling, message signaling, file transfer signaling, streaming signaling, among other options) is based on a SIP based core network, which may in some cases be a 3GPP IMS core network.

MC service servers, which may also be referred to as MCX Servers throughout this disclosure, may include one or a plurality of such servers as an MCPTT Server, an MCVideo Server, an MCData Server, among other options. An MC service server will typically handle most of the MC service signaling and the MC service logic.

A location management server receives and stores user location data/information, provides user location information to MC service servers, and may acquire location information provided by Public Land Mobile Network (PLMN) operators.

In some deployment scenarios, commercial PLMN operators may operate the IMS/SIP core network for a Public Safety agency's MC service while the MC service application layer, MC service Server (which could be an MCPTT Server, an MCVideo Server, an MCData Server, location management server, etc.) and other application layer network entities may either be operated by a Public Safety Agency or a Public Safety Service Provider such as the USA First Responders Network Authority (FirstNet). Some Public Safety communications are considered highly sensitive, not only in terms of the actual media communication (e.g. voice, video, messaging, data stream, files, etc.), but also in terms of the identities of the parties involved in a call and the nature of that call.

All MC services utilize an IMS/SIP core. Typically, public safety agencies offer these services via the public safety agency's own IMS/SIP core (which may be shared with other public safety agencies), another company's IMS/SIP core or via an IMS belonging to a carrier/PLMN. However, in the latter two cases, the IMS/SIP core utilized will typically be an isolated IMS/SIP core generally deployed for the purposes of offering MC services to the public safety agency and its users.

Mission Critical (MC) Service Identity (ID)

The MC service ID is defined in 3GPP Technical Specification (TS) 23.280, "Common functional architecture to support mission critical services; Stage 2", as for example provided in v.15.0.0, June 2017. The MC service ID is defined as "A generic name for the user ID of a mission critical user within a specific MC service. MC service ID could be replaced by MCPTT ID, or MCVideo ID, or MCData ID depending on the context.".

Each of MCPTT ID, MCVideo ID and MCData ID: are an instance of an MC service ID within the MCPTT service, MCVideo service, and MCData service, respectively; are globally unique within each service; provide an identity for a user within the respective service; may identify the home/primary MC system of the associated MC user; and are formatted as a URI.

Other instances of the MC service ID may exist, and the solutions herein are not necessarily limited to only the MCPTT, MCVideo, and MCData services.

Attributes associated with instances of the MC service ID configured in the MC services exist that relate to the human user of the MC service. Typically, this information identifies the MC service user by name or role, and may also identify a user's organization or agency. Such attributes associated with an instance of an MC service ID can be used by the MC service server to make authorization decisions about the MC service granted to the user. For example, an attribute that identifies a user's role as an incident commander could automatically be used by the MC service to grant the user additional administrative rights, such as the ability to create groups, granting access to privileged talk groups, among other options.

MC Service User Authentication and Authorization

In all MC services, an application level MC service authentication procedure takes place before the user performs an IMS/SIP core registration and before the user obtains MC service authorization. This procedure authenticates the MC service user for an MC system, and provides a security token to be used by the UE during a subsequent IMS/SIP core initial registration. The authentication and authorization is performed in order to provide access to the MC user's MC services, including the necessary MC service servers.

The authentication and authorization functionality is provisioned in a Mobile Entity (ME), for example as server addresses, and is independent of the UICC. As used herein, a mobile entity could also be referred to as a mobile device or a user equipment (UE).

An overview of the MC user authentication and authorization procedure is provided in 3GPP TS 33.180, "Security of the Mission Critical Service". A portion of this technical specification is described below with regards to FIG. 3.

Figure 3:
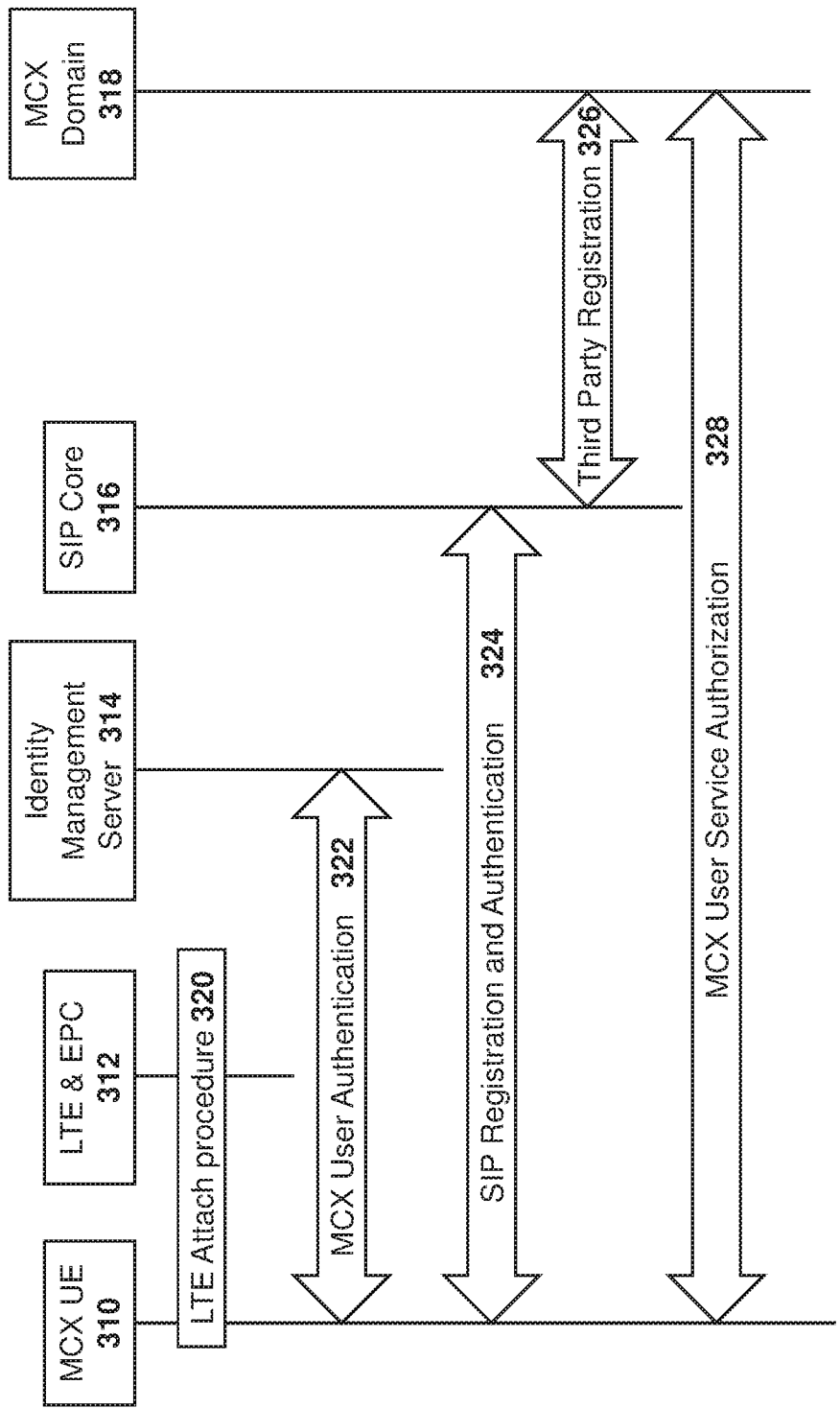
FIG. 3 is a dataflow diagram showing one or more mission critical services (MCX) authentication and authorization.

Reference is now made to FIG. 3, which shows the generic steps for MCX user authentication and authorization. In particular, in the embodiment of FIG. 3, an MCX UE 310 may communicate with an LTE and an enhanced packet core (EPC) network 312. Further, UE 310 may communicate with an ID management server 314 and a SIP core 316. The SIP core 316 may be an IMS. The MCX domain is shown by block 318 in the embodiment of FIG. 3.

The MCX UE 310 first performs LTE authentication and attach procedure, as shown by block 320. The authentication is, for example, specified in 3GPP TS 33.401, "3GPP System Architecture Evolution (SAE); Security architecture", as for example provided in v.15.0.0, June 2017.

The MCX UE 310 then performs the following steps to complete the authentication of the user, authorization of the user, MCX service registration, and identity binding between signaling layer identities and the MC service IDs.

The MCX UE 310 may perform MCX user authentication, as shown by arrow 322, and SIP registration and authentication, as shown by arrow 324. The steps at arrows 322 and 324 may be performed in either order or in parallel. Further, in scenarios where the order has an impact on identity bindings between a signaling layer identity and the MC service ID, reregistration to the SIP core may be performed to update the registered signaling layer identity.

Therefore, in accordance with the embodiment of FIG. 3, MCX UE 310 performs an MCX user authentication as shown by arrow 322 with the Identity Management server 314.

Figure 4:
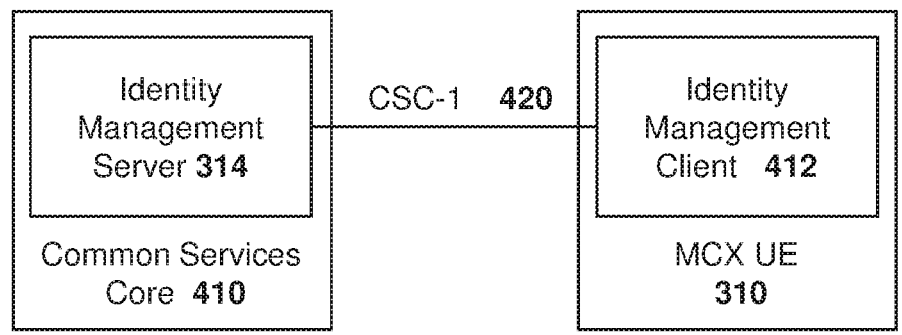
FIG. 4 is a block diagram showing a functional model for MCX identity management.

Referring to FIG. 4, Identity Management server 314 is located in the MC common services core 410 and communicates with an Identity Management client 412 located at the MCX UE 310. These entities establish the foundation for MCX user authentication and user authorization.

The CSC-1 reference point, between the Identity Management client 412 in the UE and the Identity Management server 314, provides the interface for user authentication. CSC-1 is a direct Hypertext Transfer Protocol (HTTP) interface between the identity management client 412 in the UE 310 and the identity management server 314. The Identity Management client 412 supports OpenID Connect 1.0, as for example defined in the OpenID Connect Core 1.0 incorporating errata set 1.

MCX user authentication, MCX user service authorization, OpenID Connect 1.0, and the OpenID Connect profile for MCX/MC service form the basis of the Identity Management architecture.

In alignment with the OpenID Connect 1.0 and OAuth 2.0 standards, CSC-1 include two Identity Management interfaces; the authorization endpoint and the token endpoint. The OAuth 2.0 standards, for example, include IETF RFC 6749, "The OAuth 2.0 Authorization Framework", and IETF RFC 6750, "The OAuth 2.0 Authorization Framework: Bearer Token Usage". These endpoints are separate and independent from each other, requiring separate and independent IP addressing. The authorization endpoint server and the token endpoint server may be collectively referred to as the Identity Management server.

The HTTP connection between the Identity Management client 412 and the Identity Management server may be protected using Hypertext Transfer Protocol (HTTP) over Transport Layer Security (TLS), which may also be referred to as Hypertext Transfer Protocol Secure (HTTPS).

To support MCX user authentication, the Identity Management server 314 is provisioned with the user's MC ID and MC service IDs (the MC service ID may be the same as the MC ID). A mapping between the MC ID and MC service ID(s) is created and maintained in the Identity Management server 314. When an MCX user wishes to authenticate with the MCX system, the MC ID and credentials are provided via the Identity Management Client 412 to the Identity Management Server 314. The Identity Management Server 314 receives and verifies the MC ID and credentials, and if valid returns at least one of: an ID token, a refresh token, and an access token to the Identity Management Client 412 specific to the credentials. The Identity Management Client 412 learns the user's MC service ID(s) from the ID token. Table 3 below shows the MCX tokens and their usage.

TABLE 3

MCX TOKENS

| Token Type | Consumer of the Token | Description |
| --- | --- | --- |
| ID token | UE client(s) | Contains the MC service ID for at least one authorised service (MCPTT ID, MCVideo ID, MCData ID). Also may contain other info related to the user that is useful to the client. |
| Access token | KMS, MCPTT server, etc. (Resource Server) | Short-lived token (definable in the IdMS) that conveys the user's identity. This token contains the MC service ID for at least one authorised service (MCPTT ID, MCVideo ID, MCData ID). |
| Refresh token | ID management server (Authorization Server) | Allows UE to obtain a new access token without forcing user to log in again. |

In support of MCX user authorization, the access token(s) obtained during user authentication is used to gain MCX services for the user. MCX user service authorization is defined in clause 5.1.3 of 3GPP TS 33.180.

To support the MCX/MC services identity functional model, the MC service ID(s) are: provisioned into the identity management server and mapped to MC IDs; provisioned into the key management service (KMS) and mapped to identity associated keys; provisioned into the MCX/MC service user database and mapped to a user profile; and provisioned into the group management server(s) (GMS(s)) and mapped to Group IDs.

Further details of the user authorization architecture are found in clause 5.1.3 of 3GPP TS 33.180.

Figure 5:
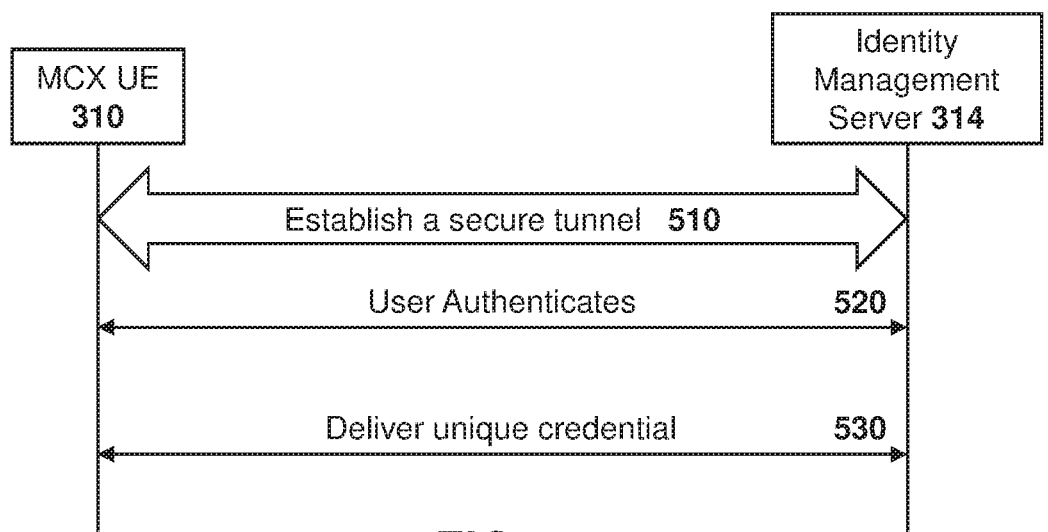
FIG. 5 is a dataflow diagram showing MCX user authentication using MCX equipment.

Reference is now made to FIG. 5, which shows the user authentication framework. The framework utilizes the CSC-1 reference point shown in FIG. 4.

In the embodiment of FIG. 5, the User Authentication procedure of arrow 322 of FIG. 3 is further detailed into 3 sub steps that comprise the MCX user authentication framework.

Specifically, as shown by arrow 510, the MCX UE 310 and Identity Management server 314 establish a secure tunnel. Subsequent steps make use of this tunnel.

At arrow 520, a User Authentication Process is performed where a user identity is provided by MCX UE 310 to the Identity Management Server 314.

At arrow 530, the credential(s) that uniquely identifies the MCX user to the MCX client are delivered.

Following the messaging at arrow 530, the MCX client uses the credential(s) obtained from the message at arrow 530 to perform MCX user service authorization in arrow 328 of FIG. 3.

The framework supporting the messaging of arrows 520 and 530 use OpenID Connect 1.0.

Referring again to FIG. 3, for the SIP registration authentication at arrow 324, processes such as those described above with regard FIG. 2 may be used.

The SIP core 316 may then perform a third-party registration with the MCX domain 318, as shown in the example of FIG. 3 as arrow 326.

Subsequently, the MCX user service authorization may be performed between the MCX UE 310 and the MCX domain 310, as shown by arrow 328.

As described above, the MC services/MCX user authentication and authorization utilizes the OpenID framework, which includes an ID_token and Access_token, amongst possibly other tokens. The tokens are obtained as per the OAuth 2.0 framework.

Figure 6:
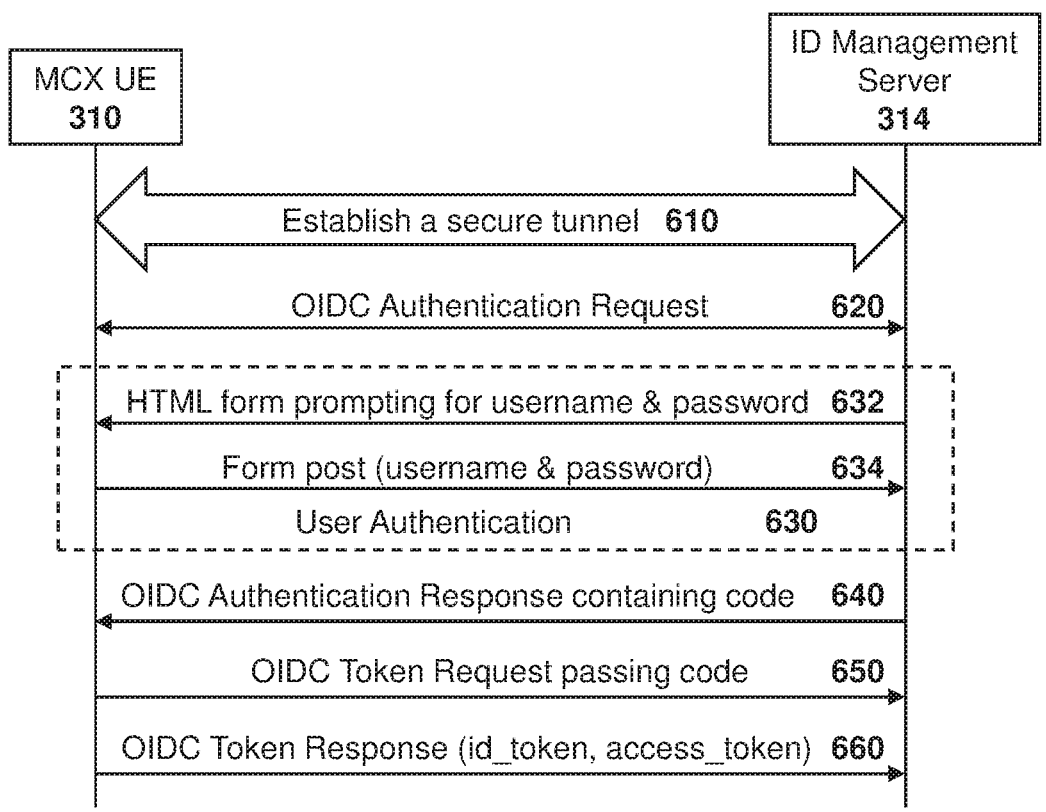
FIG. 6 is a dataflow diagram showing an OpenID connect flow for supporting MCX user authentication.

Reference is now made to FIG. 6, which describes the MCX User Authentication Framework using the OpenID Connect protocol. Specifically, FIG. 6 shows the steps by which an MCX user equipment 310 authenticates to the Identity Management server 314, resulting in a set of credentials delivered to the UE uniquely identifying the MC service ID(s). The means by which these credentials are sent from the UE to the MCX services are described in clause 5.1.3 of 3GPP TS 33.180.

The authentication framework supports extensible user authentication solutions based on the MCX service provider policy, with username/password-based user authentication as a supported method. Other user authentication methods such as biometrics, secureID, among other options, are possible.

Thus, as seen in FIG. 6, UE 310 establishes a secure tunnel with the Identity Management server 314, as shown by arrow 610.

Next, UE 310 sends an OpenID Connect Authentication Request at arrow 620 to the Identity Management server 314. The request may contain an indication of authentication methods supported by the UE 310.

User Authentication is next performed, as shown by block 630. The primary credentials for user authentication (e.g. biometrics, secureID, OTP, username/password) are based on MCX service provider policy.

In one example, Identity Management Server 314 sends an HTML message e.g. HTML form to UE 310 prompting the user for their username & password, shown by arrow 632.

In response, UE 310 sends the username & password (as provided by the user) to the Identity Management server 314, as shown by arrow 634.

Identity Management server 314 next sends an OpenID Connect Authentication Response, shown by arrow 640, to the UE 310 containing an authorization code.

UE 310 sends an OpenID Connect Token Request, shown by arrow 650, to the Identity Management server 314, passing the authorization code.

Identity Management server 314 then sends an OpenID Connect Token Response, as shown by arrow 660, to the UE 310 containing an ID_token and an access_token (each of which uniquely identify the user of the MCX service). The ID_token is consumed by the UE 310 to personalize the MCX client for the MCX user, and the access token is used by the UE 310 to communicate the identity of the MCX user to the MCX server(s). Thus, it is in the messages of arrow 660 where the tokens are returned.

An example message for arrow 660 showing the contents is provided in Table 4 below.

TABLE 4

Example message contents

HTTP/1.1 200 OK
Content-Type: application/json
Cache-Control: no-cache, no-store TABLE 4-continued Example message contents Pragma: no-cache
{
"access_token":"S1AV32hkKG",
"token_type":"Bearer",
"expires_in":3600,
"refresh_token":"tGzv3JOkF0XG5Qx2T1KWIA",
"id_token":"eyJO ... NiJ9.eyJic ... I6ljlifX0.DeWt4Qu ... ZXso"
}

Table 4 shows a message containing an access_token, which comprises a string of characters. It also contains an id_token, which appears as a string of characters. However, if the string of characters is decoded it will be what is shown in Table 5 below.

The id_token and access_token are part of the OpenID connect framework, where tokens are described using "JSON Claims". "JSON Claims" may also be known as attributes. OpenID has a standard set of JSON claims that can be expanded to comprise of other/further JSON claims.

The id_token resembles the concept of an identity card and is described in a JWT profile. The id_token contains attributes that identify the user, including for example a name, address, phone numbers, among other data.

TABLE 5

Example id_token using JSON claim schema

{
"sub": "248289761001",
"name":"Jane Doe",
"given_name":"Jane",
"family_name":"Doe",
"preferred_username":"j.doe",
"email": "janedoe@example.com"
"picture":"http://example.com/janedoe/me.jpg"
}

Table 5 shows an example JSON claim schema for an id_token. This is then coded as an alphanumeric string and sent in the id_token as shown in Table 4 as a string of characters.

UICC

A UICC is identified by an Integrated Circuit Card Identification (ICCID). There is only one ICCID per UICC. It is stored in an elementary file (EF) identified as $EF_{ICCID}$, as specified in ETSI TS 102 221, "Smart Cards; UICC-Terminal interface; Physical and logical characteristics", as for example found in v.8.2.0 (June 2009).

When a device or UE or ME or terminal initializes and decides it needs to select a UICC application, instance or profile, the device will look at the $EF_{DIR}$ file and select an application from that file. This is for example provided in 3GPP TS 31.103, "Characteristics of the IP Multimedia Services Identity Module (ISIM) application", as for example provided in v.14.2.0, June 2017. An excerpt from this TS is provided in Table 6 below.

TABLE 6

Extract from 3GPP TS 31.103

5.1.1.1 ISIM application selection
If the Terminal wants to engage in IMS operation, then after UICC activation (see TS 31.101), the Terminal shall select an ISIM

TABLE 6-continued

Extract from 3GPP TS 31.103 application, if an ISIM application is listed in the $EF_{DIR}$ file, using the SELECT by DF name as defined in TS 31.101.

The $EF_{DIR}$ file contains a list of Application Identifiers (AIDs) and associated label strings. The $EF_{DIR}$ file is defined in 3GPP TS 31.101, "Technical Specification Group Terminals; UICC-Terminal Interface; Physical and Logical Characteristics", as for example found in v.14.1.0, March 2017. An excerpt is shown in Table 7 below.

TABLE 7

Extract from 3GPP TS 31.101

13 Application independent files
13.1 $EF_{DIR}$
$EF_{DIR}$ is a linear fixed file under the MF and is under the responsibility of the issuer.

Table 13.1: $EF_{DIR}$ at MF-level
Identifier: '2F00' Structure: Linear fixed Mandatory
SFI: Mandatory
Record size: X bytes Update activity: low
Access Conditions:

READ ALW
UPDATE ADM
DEACTIVATE ADM
ACTIVATE ADM

| Bytes | Description | M/O | Length |
|---|---|---|---|
| 1 to X | Application template TLV object | M | X bytes |

The EF consists of one or more records, with each record able to hold one entry. Each entry in the $EF_{DIR}$ is an application template Data Object (DO) as defined in ISO/IEC 7816-4. An application template DO is a constructed BER-TLV object with a maximum length of 127 bytes and has a mandatory AID DO. Within the scope of the present document, all other DOs are optional.
In table 13.2 the coding of the mandatory DOs and the optional DOs that has special meaning to the present document. All other DOs are according to ISO/IEC 7816-4.
Table 13.2: Coding of an application template entry

| Length | Description | Status |
|---|---|---|
| 1 | Application template tag = '61' | M |
| 1 | Length of the application template = '03'-'7F' | M |
| 1 | Application Identifier tag = '4F' | M |
| 1 | AID length = '01'-'10' | M |
| '01' to '10' | AID value. See ETSI TS 101 220 | M |
| 1 | Application label tag = '50' | O |
| 1 | Application label length | O |
| note 1 | Application label value | O |

NOTE 1: The application label is a DO that contains a string of bytes provided by the application provider to be shown to the user for information, e.g. operator name. The value part of the application label shall be coded according to annex A. It is recommended that the number of bytes in the application label does not exceed 32.

NOTE 2:
Other DOs from ISO/IEC 7816-4 may, at the application issuer's discretion, be present as well.

An AID has two components, the first is a "Registered application provider Identifier" (RID), which is five bytes in length, and the second is a "Proprietary application Identifier eXtension" (PIX), which is up to eleven bytes in length. The RID identifies 3GPP (its value/coding is "A000000087"), the first nine bytes of the PIX identifies the application e.g. USIM, ISIM, etc., with the last two bytes being available for "Application Provider Specific data". The AID is standardized in ETSI TS 101 220, "Smart Cards; ETSI numbering system for telecommunication application providers", as for example found in v. 11.0.0, June 2011.

ISIM Data

ISIM data requirements are specified in 3GPP TS 33.203, "3G security; Access security for IP-based services", for example in v. 14.1.0, June 2017.

Clause 8.1 of this TS identifies requirements on the ISIM application to support IMS access security. It does not identify any data or functions that may be required on the ISIM application for non-security purposes.

In clause 8.1, it is specified that the ISIM application shall include: the IP Multimedia Private user Identity (IMR); at least one IP Multimedia Public user Identity (IMPU); Home Network Domain Name; support for sequence number checking in the context of the IMS Domain; the same framework for algorithms as specified for the USIM applies for the ISIM; and an authentication Key.

ISIM Authentication

ISIM authentication is, for example, defined in 3GPP TS 33.203, and in particular in section 6.1.1. A message sequence and information flow of how a UE with an ISIM registers with the IMS and which parameters are used in that operation is shown below with regards to FIG. 7.

Before a user can get access to the IM services, at least one IMPU needs to be registered and the IMPI authenticated in the IMS at application level. In order to get registered, the UE sends a SIP REGISTER message towards the SIP registrar server i.e. the S-CSCF, which will perform the authentication of the user in conjunction with the HSS. The message flows are the same regardless of whether the user has an IMPU already registered or not.

Figure 7:
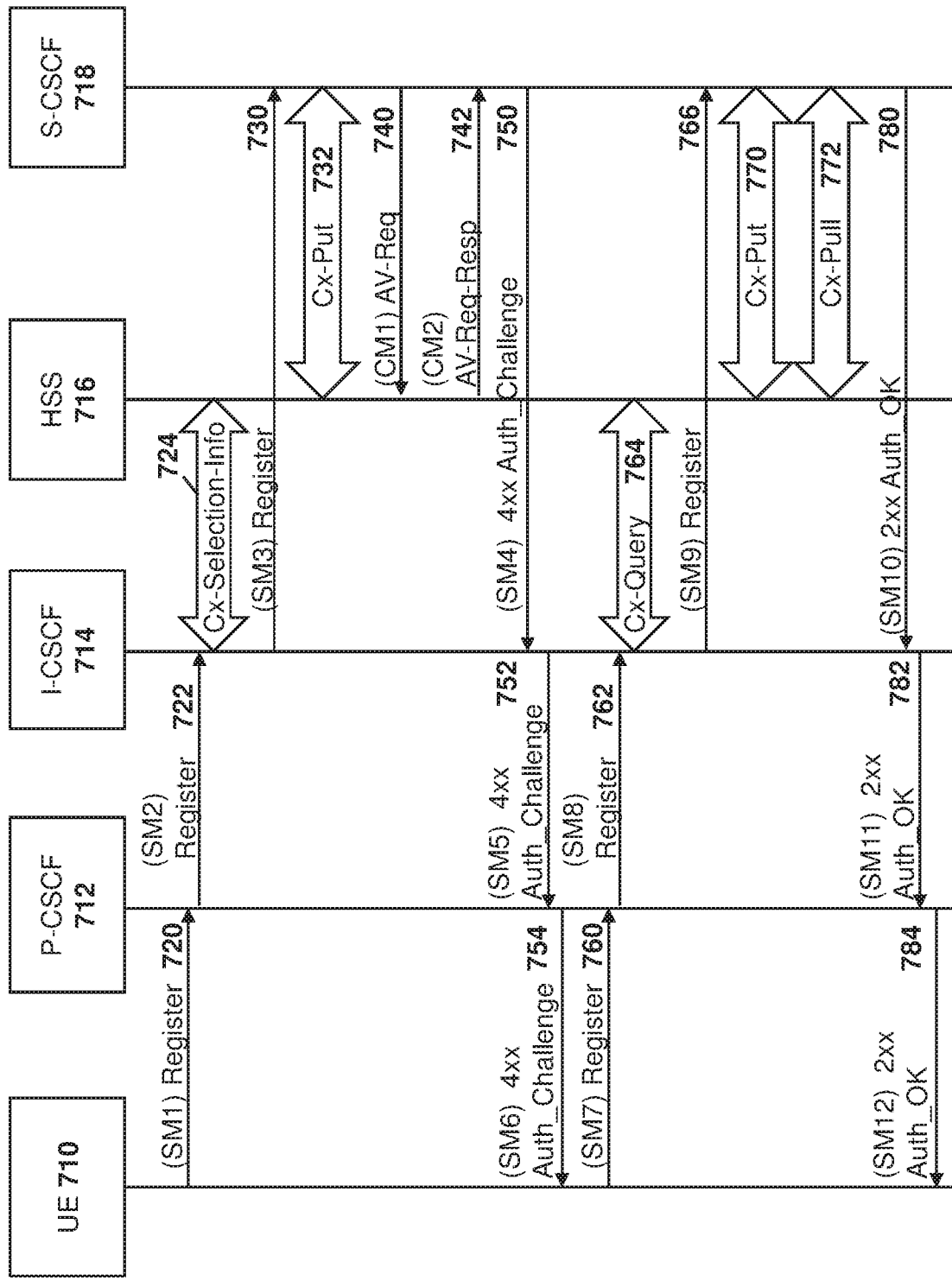
FIG. 7 is a dataflow diagram showing IMS authentication and key agreement.

Thus, as seen in FIG. 7, UE 710 communicates with the P-CSCF 712. Further, a network includes I-CSCF 714 as well as HSS 716 and S-CSCF 718.

The registration procedure includes the UE 710 sending a register message 720 to P-CSCF 712. As used in FIG. 7, SMn stands for SIP Message n and CMm stands for Cx message m which has a relation to the authentication process.

The registration message is then forwarded in message 722 to the I-CSCF 714.

Based on received message 722, I-CSCF 714 performs a Cx-Selection with HSS 716, as shown by block 724.

I-CSCF 714 may send a registration message 730 to the S-CSCF 718.

The S-CSCF 718, in response to message 730, performs a CX-put procedure 732 with HSS 716.

Based on the CX-put, S-CSCF 718 may use an Authentication Vector (AV) for authenticating and agreeing a key with the user. If the S-CSCF 718 has no valid AV then the S-CSCF 718 sends a request 740 for AV(s) to the HSS 716 in CM1 together with the number m of AVs wanted, where m is at least one.

Each authentication vector consists of the following components: a random number RAND, an expected response XRES, a cipher key CK, an integrity key IK and an authentication token AUTN. Each authentication vector is good for one authentication and key agreement between the S-CSCF 718 and the IMS user (as identified by the IMPI).

For example, response 742 sent back to S-CSCF 718 may be in the form Cx-AV-Req-Resp(IMPI, RAND1∥AUTN1∥XRES1∥CK1∥IK1, . . . , RANDn∥AUTNn∥XRESn∥CKn∥IKn).

Based on the response, S-CSCF 718 sends an authentication challenge to the UE through I-CSCF 714, as shown by message 750. When the S-CSCF 718 needs to send an authentication challenge to the user, it selects the next authentication vector from the ordered array, i.e. authentication vectors in a particular S-CSCF are used on a first-in/first-out basis. However, this does not preclude the use of the normal SIP transaction layer re-transmission procedures.

Message 750 may be in the form SM4:4xx Auth_Challenge(IMPI, RAND, AUTN, IK, CK).

Message 750 is forwarded to P-CSCF 712 in message 752. When the P-CSCF receives message 752, it stores the key(s) (IK and CK), and forwards the rest of the message without the keys to the UE 710 in message 754. Message 754 may take the form SM6:4xx Auth_Challenge(IMPI, RAND, AUTN).

Upon receiving the challenge in message 754, the UE takes the AUTN, which includes a MAC and the SQN. The UE calculates the XMAC and checks that XMAC=MAC and that the SQN is in the correct range as in 3GPP TS 33.102. If both these checks are successful, the UE uses RES and some other parameters to calculate an authentication response.

This response is put into the Authorization header and sent back to the registrar in register message 760. It should be noted that the UE at this stage also computes the session keys CK and IK. In particular, the UE 710 sends a register message 760 to P-CSCF 712. Message 760 may be in the form SM7: REGISTER (IMPI, Authentication response).

The registration message is then forwarded in message 762 to the I-CSCF 714.

Based on received message 762, I-CSCF 714 performs a Cx-Query with HSS 716, as shown by block 764.

I-CSCF 714 may send a registration message 766 to the S-CSCF 718.

S-CSCF 718 may then perform a CX-put procedure 770 with HSS 716 and a CX-pull procedure 772 with HSS 716, and provide a 2xx response, e.g. "200 OK", message 780 back to I-CSCF 714.

I-CSCF 714 then forwards the 2xx response message to the P-CSCF 712 as message 782. P-CSCF 712 then forwards the 2xx response message as message 784 back to UE 710. The 2xx response message 784 indicates to the UE 710 that it has successfully registered for IMS services.

LTE Data Connectivity

A UE wishing to use cellular data connectivity or services may make use of at least one Evolved-Universal Mobile Telephony System (UMTS) Terrestrial Radio Access Network (E-UTRAN), Enhanced Packet Core (EPC) and a Packet Data Network (PDN). The combination of an E-UTRAN and an EPC is known as an enhanced packet system (EPS). For a 5G system, this comprises of one or both of a Next Generation (NG) radio and NG core network.

Figure 8:
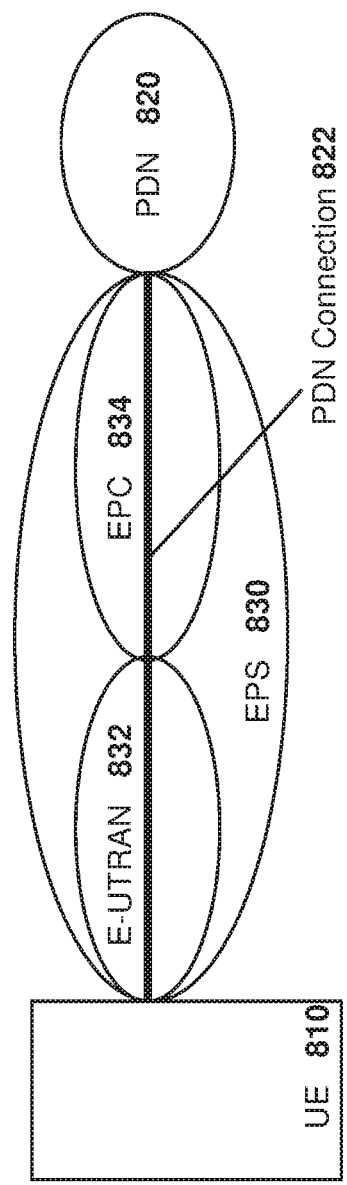
FIG. 8 is a block diagram showing a PDN connection.

Reference is now made to FIG. 8. In the example of FIG. 8, UE 810 connects with a PDN 820 utilizing a PDN connection 822. Such PDN connections may, in some embodiments, be referred to as packet data protocol (PDP) contexts in second generation (2G) or third generation (3G) networks, or referred to as Packet Data Unit (PDU) sessions in fifth generation (5G) networks. PDN connection 822 may be used to transmit and receive data such as signaling or control plane data, user plane data, voice/audio media, video media among other data options, between the UE 810 and PDN 820. A PDN connection 822 provides a mechanism for a UE to communicate with a PDN.

PDN connection 822 is typically over an E-UTRAN 832 and EPC 834, as provided in FIG. 8. However, in other embodiments the connectivity may be over a wireless local area network (WLAN) and an EPC, and the present disclosure is not limited to a particular PDN connection 822.

The E-UTRAN 832 and EPC 834 typically, but not always, belong to a PLMN/mobile network operator or cellular carrier, whereas the PDN 820 may belong to an operator or other entity. For example, the PDN may belong to a corporation, a public safety agency or an enterprise network.

EPS 830 may consist of only an HPLMN ($1^{st}$ service provider) or may further consist of HPLMN and a VPLMN ($2^{nd}$ service provider), with the latter being used for roaming. Such HPLMN and VPLMN are not shown in FIG. 8 for brevity.

EPS 830 may consist of various entities. These include one or more of an enhanced Node B (eNB), Mobile Management Entity (MME), Serving Gateway (S-GW), PDN Gateway (P-GW), and/or Home Subscriber Server (HSS), among other network nodes.

PDN connection 822 provides a path for data between a UE 810 and a PDN 120. During PDN connection establishment, the PDN 820 is identified by an access point name (APN), and thereafter by other parameters in the established PDN connection. The APN can identify a gateway node (e.g. P-GW, a Gateway General Packet Radio Service (GPRS) Support Node (GGSN), among others, in the EPC 834 that allows access to the PDN 820.

As defined in the $3^{rd}$ Generation Partnership Project (3GPP) Technical Specification (TS) 23.003, *"Numbering, addressing and identification"*, as for example provided in v.14.3.0, March 2017, an APN consists of a network identity (NI) and an operator identity (OI) portion. Both the NI and OI portions consist of a string of characters separated by dots. The characters in between the dots are referred to as "labels".

In one embodiment, the content of the NI portion may be undefined, whereas the content of the OI portion is strictly defined. The OI portion is generally appended by the network to the end of an NI. Network nodes that may perform this function include, but are not limited to, the Serving GPRS Support Node (SGSN), MME, S-GW, P-GW, among others.

In other embodiments, the UE may provide both the NI and OI if the UE wishes to specifically request breakout to a PDN in a specific Public Land Mobile Network (PLMN) and in the absence of the OI being provided by the UE, the network uses defined logic to decide the OI to append to the NI. Such defined logic, for example, may be found in 3GPP TS 23.060, *"General Packet Radio Service (GPRS); Service description; Stage 2"*, as for example provided in v.14.4.0, June 2017.

A UE is roaming when it is not attached to a PLMN that is its HPLMN or an Extended HPLMN (EHPLMN). When the UE is roaming, a PDN connection may connect to a PDN in the VPLMN or HPLMN. A connection to a PDN in the VPLMN is sometimes referred to as "local break-out" (LBO). A connection to a PDN in the HPLMN while the UE is roaming is sometimes referred to as "home routed" or S8 Interface Home Routed ("S8HR").

A UE may have more than one PDN connection if the UE needs to connect to more than one PDN. A PDN connection consists of one or more EPS bearers, which may be referred to simply as "bearers", for the data to be transmitted and received between the UE and the network. One EPS bearer within a PDN connection is considered the "default bearer" or "default EPS bearer" and is usually the one created at the time of PDN connection establishment. The rest of the EPS bearers besides the default EPS bearer are known as "dedicated EPS bearers" or simply "dedicated bearers" and are used to provide a different Quality of Service (QoS) for data from the default EPS bearers.

Each EPS bearer has a QoS Class Identifier (QCI). A full list of QCIs can be found, for example, in subclause 6.1.7.2 of 3GPP TS 23.203, *"Policy and charging control architecture"*, as for example provided in v.14.4.0, June 2017. Besides the QCI, other information such as a traffic flow template may be used to decide which data goes over which EPS bearer in some embodiments.

In some embodiments, a UE may be configured, preconfigured or provisioned with APNs for different services, features or functions. In other embodiments, a "well known" APN may be used in addition to such provisioned APNs or instead of provisioned APNs. A well-known APN is an APN whose value is standardized or specified to be a specific value. An example of a well-known APN is the "IMS well-known APN", also referred to in some documents as the "IMS APN". Some IMS based services deployed by HPLMNs make use of the APN connection to an IMS well-known APN.

The details of the IMS well-known APN are defined, for example, in the Global System for Mobile communications (GSM) Association (GSMA) Permanent Reference Document (PRD) IR.88, *"LTE Roaming Guidelines"*, v. 9.0, January 2013. Essentially, the IMS well-known APN has a value of "IMS" and is used by services such as Voice over Long Term Evolution (VoLTE), as for example defined in GSMA PRD IR.92, *"IMS Profile for Voice and SMS"*, as for example provided in v. 11.0, June 2017, and in Rich Communication Services (RCS), as for example defined in GSMA PRD RCC.07, *"Rich Communication Suite 6.0 Advanced Communications Services and Client Specification"*, as for example provided in v. 7.0, March 2016, among others.

The UE establishes a PDN connection to the IMS well-known APN, ensuring that the default EPS bearer for this PDN connection has a specific QCI value of "5", which is appropriate for signaling messages as defined in 3GPP TS 23.401, *"General Packet Radio Service (GPRS) enhancements for Evolved Universal Terrestrial Radio Access Network (E-UTRAN) access"*, as for example provided in v.15.0.0, June 2017, and in 3GPP TS 23.203. The UE may then establish one or more dedicated EPS bearers for voice/audio and video media on an as needed basis, with QCI values of one and two respectively. A PDN connection to the IMS well-known APN may be referred to as an IMS PDN connection.

Despite the value of the IMS well-known APN being standardized, the IMS PDN connection provides a connection to a PDN in either the UE's HPLMN or the UE's VPLMN. That is, the PDN that is connected to by one UE may differ to another UE if the other UE has different HPLMN and/or is attached to a different PLMN which may be dependent on whether the UE is roaming. For example, the UEs may have different Subscriber Identity Modules (SIMs), Universal Subscriber Identity Modules (USIMs) or IMS Subscriber Identity Modules (ISIMs).

Fifth Generation (5G)

5G is the next generation of wireless communications systems. It consists of a RAN and core network. A 5G operator/carrier may configure their RAN and/or core networks so that they support multiple network slices/virtual networks, whereby different functionality is provided by a common hardware platform. A network slice is identified by an S-NSSAI (Single Network Slice Selection Assistance Information), which is currently defined in 3GPP TS 23.501, "System Architecture for the 5G System", as provided in v. 1.1.0, July 2017. An excerpt from this TS is provided in Table 8 below.

TABLE 8

Extract from 3GPP TS 23.501

5.15.2 Identification and selection of a Network Slice: The S-NSSAI and the NSSAI
5.15.2.1 General
An S-NSSAI (Single Network Slice Selection Assistance information) identifies a Network Slice.
An S-NSSAI is comprised of:
A Slice/Service type (SST), which refers to the expected Network Slice behaviour in terms of features and services;
A Slice Differentiator (SD). which is optional information that complements the Slice/Service type(s) to differentiate amongst multiple Network Slices of the same Slice/Service type.
The S-NSSAI can have standard values or PLMN-specific values. S-NSSAIs with PLMN-specific values are associated to the PLMN ID of the PLMN that assigns it. An S-NSSAI shall not be used by the UE in access stratum procedures in any PLMN other than the one to which the S-NSSAI is associated.
The NSSAI is a collection of S-NSSAIs (Single Network Slice Selection Assistance Information). There can be at most 8 S-NSSAIs in the NSSAI sent in signalling messages between the UE and the Network. Each S-NSSAI assists the network in selecting a particular Network Slice instance.
The same Network Slice instance may be selected by means of different S-NSSAIs.
Based on the operator's operational or deployment needs, multiple Network Slice instances of a given S-NSSAI may be deployed in the same or in different registration areas. When multiple Network Slice instances of a given S-NSSAI are deployed in the same registration area, the AMF instance serving the UE may logically belong to more than one Network Slice instances of that S-NSSAI, i.e. this AMF instance may be common to multiple Network Slice instances of that S-NSSAI. When a S-NSSAI is supported by more than one Network Slice instance in a PLMN, any of the Network Slice instances supporting the same S-NSSAI in a certain area may serve, as a result of the Network Slice instance selection procedure defined in clause 5.15.5, a UE which is allowed to use this S-NSSAI. Upon association with an S-NSSAI, the UE is served by the same Network Slice instance for that S-NSSAI until cases occur where e.g. Network Slice instance is no longer valid in a given registration area, or a change in UE's Allowed NSSAI occurs etc. In such cases, procedures mentioned in clause 5.15.5.2.2 or clause 5.15.5.2.3 applies.
The selection of a Network Slice instance(s) serving a UE and the Core Network Control Plane and user plane Network Functions corresponding to the Network Slice instance is the responsibility of 5GC.
The (R)AN may use Requested NSSAI in access stratum signalling to handle the UE Control Plane connection before the 5GC informs the (R)AN of the Allowed NSSAI. The Requested NSSAI is not used by the RAN for routing when the UE provides also a Temporary User ID.
When a UE is successfully registered, the CN informs the (R)AN by providing the whole Allowed NSSAI for the Control Plane aspects.
When a PDU Session for a given S-NSSAI is established using a specific Network Slice instance, the CN provides to the (R)AN the S-NSSAI corresponding to this Network Slice instance to enable the RAN to perform access specific functions.
NOTE: The details of how the RAN uses NSSAI information is described in 3GPP TS 38.300.

Once a UE has registered with a Network Slice it can then establish a PDU session.

Figure 9:
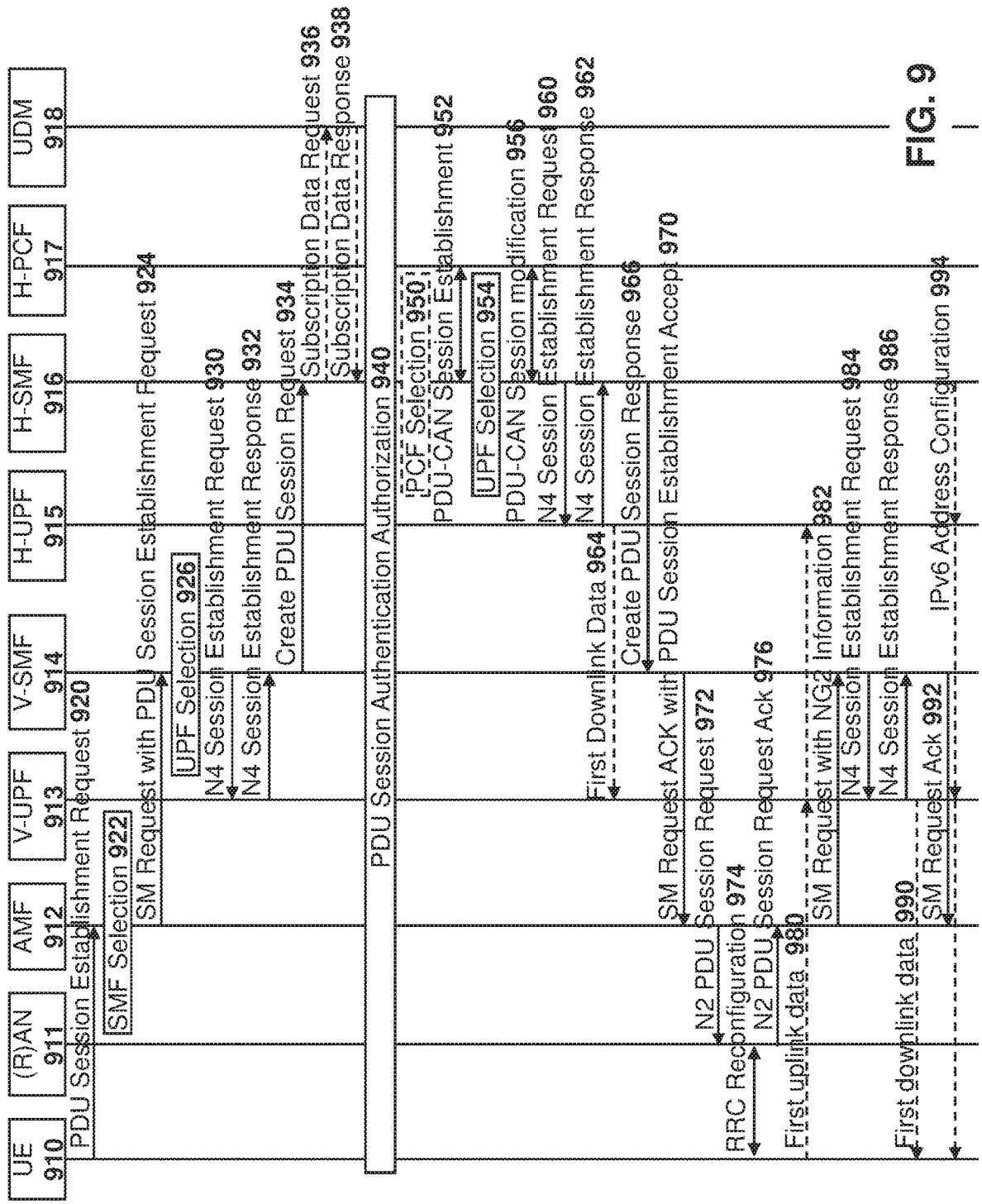
FIG. 9 is a block diagram showing a user equipment requested PDU session establishment in a 5G network.

Reference is now made to FIG. 9, which shows Packet Data Unit (PDU) establishment in a 5G network. In particular, UE 910 is in a visited PLMN which includes (Radio) Access Network ((R)AN) 911, Access and Mobility management Function (AMF) 912, Visited-User Plane Function (V-UPF) 913, and Visited-Session Management Function (V-SMF) 914. In addition, in the Home PLMN of UE 910 there is a Home-User Plane Function (H-UPF) 915, a Home-Session Management Function (H-SMF) 916, a Home-Policy Control Function (H-PCF) 917 and a Unified Data Management (UDM) 918.

A PDU session establishment request 920 is first sent from UE 910 to the visited AMF 912. This is for example defined in clause 4.3.2.2.1 of 3GPP TS 23.502, "Procedures for the 5G System", as for example provided in v. 0.5.0, July 2017.

AMF 912 then performs an SMF selection, as shown by block 922. The AMF 912 performs the functions of clause 4.3.2.2.1, with the addition that the AMF also selects an SMF in the HPLMN. The AMF stores an association of the PDU session ID and the SMF ID in the VPLMN.

AMF 912 may then send a session management (SM) request with a PDU session establishment request 924 to the V-SMF 914. This is similar to the steps in clause 4.3.2.2.1, with the addition that the AMF also provides the identity of the SMF in the HPLMN it has selected in block 922. The AMF identifier uniquely identifies the AMF serving the UE. The H-SMF 916 is provided when the PDU session is home-routed. The N1 SM information contains the PDU session establishment request received from the UE.

V-SMF 914 may then select a UPF, as shown at block 926. Such selection is, for example, described in 3GPP TS 23.501, clause 6.3.3.

The V-SMF 914 then initiates an N4 session establishment procedure with a request 930 with the selected V-UPF 913. In particular, request 930 is sent to V-UPF 913. If core network (CN) tunnel information is allocated by the SMF, the CN tunnel information is provided to the V-UPF in this request.

The V-UPF 913 acknowledges by sending an N4 session establishment response 932 back to V-SMF 914. If CN tunnel information is allocated by the V-UPF, the CN tunnel information is provided to the V-SMF 914 in this response.

On receiving response 932, V-SMF 914 may then create a PDU session request 934 and send it to the H-SMF 916. Such request may include subscriber permanent identity, Data Network Name (DNN), S-NSSAI, PDU Session ID, V-SMF ID, V-CN-Tunnel-Info, PDU type, Protocol Configuration Options, User Location Information, SM PDU Data Network (DN) Request Container, among other information.

The H-SMF 916 may then send a subscription data request 936 to UDM 918 and the UDM 918 may then send a subscription data response 938 back. This allows for PDU session authentication authorization as shown by block 940.

The H-SMF 916 may then perform a PCF selection, as shown by block 950, and may further perform PDU-CAN session establishment 952. The H-SMF 916 then performs UPF selection at block 954 and may then perform Packet Data Unit-Cellular Access Network (PDU-CAN) session modification as shown with arrow 956. The H-SMF 916 may then perform the N4 Session Establishment Request 960 with the H-UPF 915 and may receive an N4 Session Establishment Response 962 in return.

At this point, first downlink data 964 may occur.

H-SMF 916 may then create a PDU Session Response 966 to the V-SMF 914. This may include the authorized Quality of Service (QoS) rule, Session and Service Continuity (SSC) mode, Home-Core Network (H-CN) Tunnel Information which contains the tunnel information for the uplink traffic towards the H-UPF among other information. Multiple authorized QoS rules may be included in the Create PDU Session Response 966. Further, the H-SMF 916 may send to the V-SMF 913 an indication if the VPLMN is allowed to insert an uplink cross layer (CL) or a Branching Point for a PDU session towards this DNN.

The V-SMF 914 may then send an SM Request ACK with PDU Session Establishment Accept Message 970 to the AMF 912.

Upon receiving the message, AMF 912 may then perform an N2 PDU Session Request with the (R)AN 911, as shown by message 972.

Radio Resource Control (RRC) Reconfiguration may then occur, as shown with arrow 974, and an N2 PDU Session Request Ack 976 is sent back to AMF 912.

Subsequently, first uplink data 980 may be sent to the H-UPF 915.

AMF 912 may then provide an SM Request with NG2 Information at message 982 to the V-SMF 914.

The V-SMF 914 initiates an N4 Session Modification Procedure with the V-UPF, as shown with the N4 Session Establishment Request Message 982. The V-SMF provides packet detection, enforcement and reporting rules to be installed on to the V-UPF for this PDU session, including AN tunnel information, H-CN Tunnel Information and V-CN Tunnel Information.

The V-UPF 913 provides an N4 session establishment or modification response to the V-SMF 914, shown as response 986 in the embodiment of FIG. 9. After the response 986, the V-UPF 913 delivers any downlink packets to the UE that may have been buffered for the PDU session.

Subsequently, first downlink data is provided as shown at message 990.

The V-SMF 914 may provide an SM Request Acknowledgement 992 to the AMF 912. Subsequently, IPv6 Address Configuration may occur by the H-SMF 916 sending a message to the UE, via the H-UPF 915, the V-UPF 913. In the case of PDU type IPv6, the H-SMF 916 generates an IPv6 Router advertisement and sends it to the UE via N4 and the H-UPF and V-UPF.

After the IPv6 Address Configuration 994, the H-SMF 916 may register the address to the UDM 918. The UDM stores the H-SMF identity and the associated DNN.

Use of Multiple ISIMs for Connecting to Multiple IMSs

In accordance with one embodiment of the present disclosure, a mobile entity or user equipment may be provided with multiple instances of UICC application e.g. an ISIM. The multiple instances of the ISIM may, but need not, reside on the UICC.

The ME may then choose UICC application e.g which ISIM to use to authenticate to different IMSs based on an indication of which service(s) or application(s) the UICC application e.g ISIM is associated with. Note that the description that follows will make reference to the ISIM, however there could equally be other UICC applications that the ME chooses to use and ISIM is used as an illustrative example.

The ISIMs in this embodiment have different application identifiers (AIDs), allowing the ME to choose which ISIM to access. Within the ME there is a binding between the AID and the ME application that uses that specific AID. This binding may either be provisioned within the ME, or be dynamic.

If the binding is dynamic, the ME selects an ISIM application, for example using the SELECT command, that contains the AID of an ISIM. The ME then determines if the selected ISIM has an indication that the ISIM is to be used for a specific service/application. The determining may include the step of downloading some or all of the contents of the UICC application e.g. ISIM into ME memory.

If the indication exists, a binding may be created between the selected ISIM and the service/application.

If an indication does not exist, the ME selects the next ISIM application and repeats the process, and the ME may, but need not, create a "default binding". Specifically, the ME may bind the ISIM without an indication to all services except those that have a bound ISIM and application. In the case of not creating a binding, the ME may delete some or all of the contents of the UICC application that was stored for the step of determining.

The ISIM indication may be via one of the following:

An Explicit field in the application on the UICC. For example, this may be a field containing a dedicated service code (e.g. a certain value or position within a bit string for VoLTE, another value for RCS, another value for MC services, etc.); or Existing fields in the application on the UICC that contain specific data. These may, for example, include:
 ICSI (IMS Communication Service Identifier)
 IARI (IMS Application Reference Identifier)
 APN (Access Point Name)
 S-NSSAI (Single Network Slice Selection Assistance information)

Figure 10:
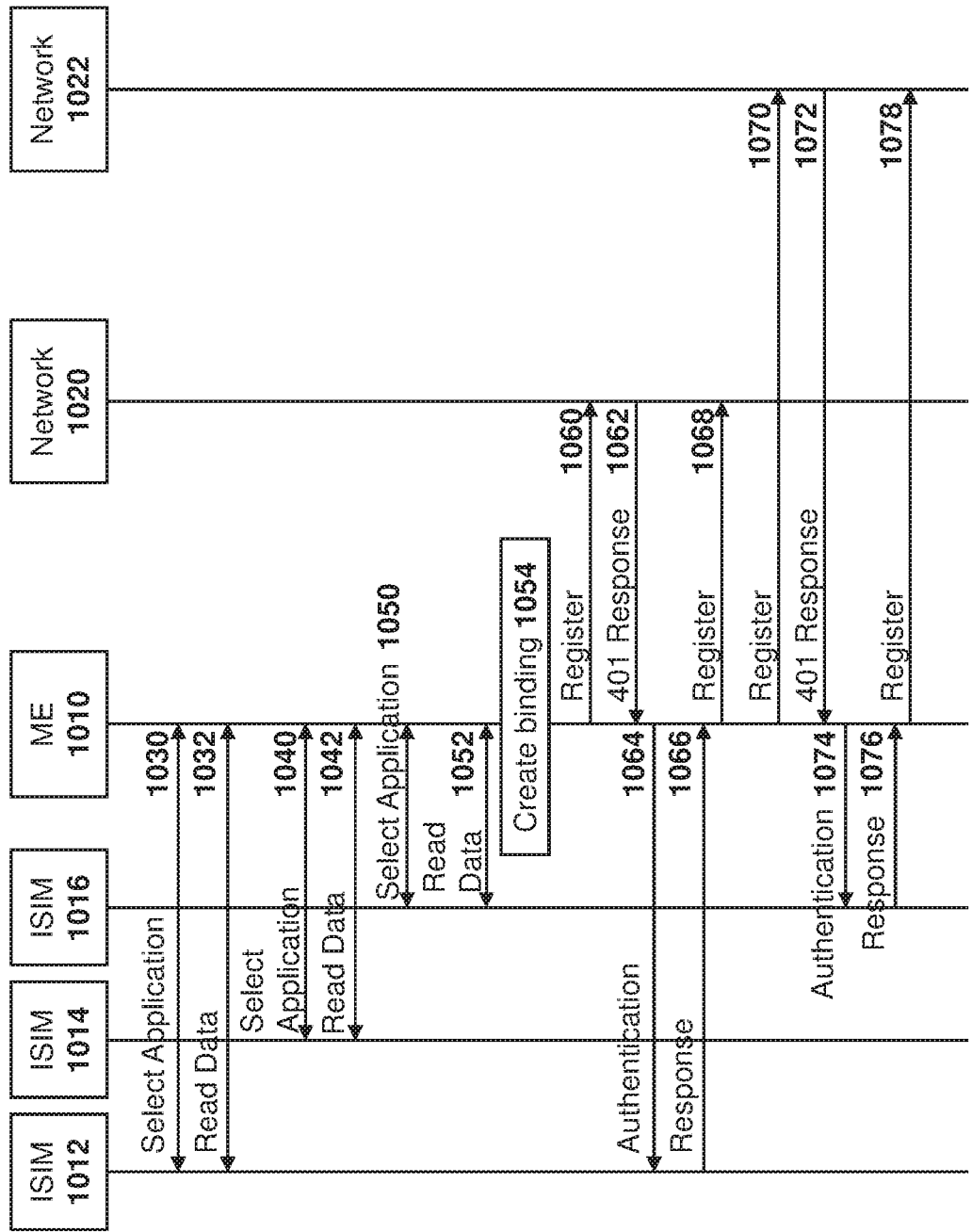
FIG. 10 is a dataflow diagram showing the registration of an ME for multiple IMS functions using a plurality of ISIMs.

Reference is now made to FIG. 10, which shows information flow for use of multiple ISIMs. In particular, in the embodiment of FIG. 10, the ME reads all the UICC applications and determines the purpose of those UICC applications if the application identifier (AID) file ($EF_{AIDAPP}$) is present. The ME then uses the public and private user identities associated with that UICC application if the ME wants to register with the network for those services. Authentication responses will be routed to the appropriate UICC application.

Thus, in the embodiment of FIG. 10, ME 1010 has three ISIMs, also referred to as UICC applications. These are shown as ISIMs 1012, 1014 and 1016.

Further, in the embodiment of FIG. 10, two IMS networks, namely networks 1020 and 1022 provide IMS services. The networks may provide IMS or SIP services and may be a SIP core in some embodiments.

In message 1030, ME 1010 selects ISIM 1012 and may send a SELECT command that contains the AID for ISIM 1012.

In response to message 1030, the ME may read data from ISIM 1012, shown by arrow 1032. Reading, in one embodiment, consists of determining if the application identifier file $EF_{AIDAPP}$ is present. If the file is present, the ME may store in its internal memory storage (e.g. RAM, Flash Memory) the $EF_{AIDAPP}$ data along with other data from ISIM 1012.

In message 1040, ME 1010 selects ISIM 1014 and may send a SELECT command that contains the AID for ISIM 1014.

In response to message 1040, the ME may read data from ISIM 1014, shown by arrow 1042. Reading, in one embodiment, consists of determining if the application identifier file $EF_{AIDAPP}$ is present. If the file is present, the ME may store in its internal memory storage (e.g. RAM, Flash Memory) the $EF_{AIDAPP}$ data along with other data from ISIM 1014.

In message 1050, ME 1010 selects ISIM 1016 and may send a SELECT command that contains the AID for ISIM 1016.

In response to message 1050, the ME may read data from ISIM 1016, shown by arrow 1052. Reading, in one embodiment, consists of determining if the application identifier file $EF_{AIDAPP}$ is present. If the file is present, the ME may store in its internal memory storage (e.g. RAM, Flash Memory) the $EF_{AIDAPP}$ data along with other data from ISIM 1016.

ME 1010 determines that it wants to register with a network for a first function/service, for example MCPTT. ME determines that the first function is associated with UICC Application for ISIM 1012 by determining that the $EF_{AIDAPP}$ for UICC Application for ISIM 1012 contains an indication or identifier of the first function in the $EF_{AIDAPP}$.

A binding is created between the first function and UICC Application for ISIM 1012, shown by block 1054. During binding, all SIP transactions that are associated with the Public and/or Private User Identities associated with the UICC Application (e.g. ISIM 1012) will result in the ME sending any necessary data to UICC Application for ISIM 1012. Such data may for example include authentication responses/challenges, among other options. The determination is described in more detail below.

As used in the example of FIG. 10, a function such as MCPTT, VoLTE, among other functions, can be identified by an ICSI, IARI, APN, or other such identifier.

If the data retrieved from ISIM 1012 and stored at ME 1010 includes an $EF_{Slice}$, then the ME selects the Network Slice based on the NSSAI. The ME then requests set-up of a PDU sending a message containing the NSSAI.

If there is an APN associated with the application, for example against Public or Private ID, $EF_{AIDAPP}$, then the APN is used to setup the PDN connections and/or PDU session. As part of the procedure of creating and activating the PDN connection and/or PDU session, one or more P-CSCF addresses are provided to the ME. For example, the addresses may be provided in the Protocol Configuration Options information element.

After selecting and storing the data from the ISIMs and creating the bindings, ME 1010 may send message 1060 to network 1020. For example, message 1060 may be a $1^{st}$ SIP REGISTER to Network 1020 containing at least one of a Public or Private user ID that was retrieved from or stored in UICC Application for ISIM 1012.

ME 1010 receives a 401 response 1062 containing authentication vectors back from network 1020.

The ME 1010 may then send some of the authentication vectors to ISIM 1012, as shown by message 1064.

ME 1010 receives response 1066 to some of the authentication vectors.

The ME 1010 may then send message 1068 back to network 1020. Message 1068 may for example be a $2^{nd}$ SIP REGISTER to Network 1020 containing some of the data from response 1066.

The ME 1010 then determines that it wants to register with a network 1022 fora second function, for example VoLTE. ME 1010 may determine that the second function is associated with UICC Application or ISIM 1016 by determining the $EF_{AIDAPP}$ for UICC Application for ISIM 1016 contains the second function in the $EF_{AIDAPP}$.

ME 1010 sends message 1070 to network 1022. For example, message 1070 may be a $3^{rd}$ SIP REGISTER to network 1022 containing at least one of a public or private user ID from UICC Application for ISIM 1016.

ME 1010 receives a 401 response 1072 containing authentication vectors.

Based on response 1072, ME 1010 sends some of the authentication vectors in message 1074 to UICC Application for ISIM 1016.

The ME 1010 may then receive response 1076 to some of the authentication vectors.

The ME 1010 may then send a message 1078 to network 1022. For example, message 1078 may be a $4^{th}$ SIP REGISTER to network 1022 containing some of the data received in response 1076.

In the embodiment of FIG. 10, the selection of the ISIM may be based on a field in the UICC application.

Specifically, in accordance with the present disclosure, the ME: selects an ISIM, determines if $EF_{AIDAPP}$ is present, reads $EF_{AIDAPP}$ and stores the $EF_{AIDAPP}$ information in its internal memory storage (e.g. RAM, Flash Memory). This for example happens at messages 1032, 1042 and 1052.

The ME 1010 performs the above operation for more than one UICC application and stores the files read in the ME's memory. For example, the operation may be performed for all ISIM applications on the UICC.

Figure 11:
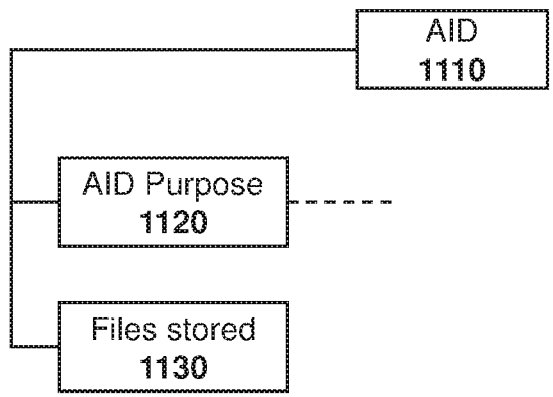
FIG. 11 is a block diagram showing an example data structure for an ISIM.

The memory structure in the ME 1010 might look like the following for each UICC application, as identified by an AID. Reference is now made to FIG. 11.

In the embodiment of FIG. 11, the AID 1110 includes an AID purpose 1120, which contains the EF storing the purpose of the AID.

Files stored 1130 contains all the data that has been read from the AID/UICC application.

Subsequently, once the information is stored on the ME, the ME makes a determination of which UICC application (ISIM) to use. Specifically, ME 1010 determines if the UICC application identified by the stored AID should be used for a specific application or for specific capabilities. This determination may be performed using any of the following.

In a first embodiment, the respective $EF_{AIDAPP}$ file contains one or more indications of what purpose or purposes the UICC application identified by the $EF_{AID}$ should be used for. Such purposes may relate for example to particular IMS functions, included but not limited to MCPTT, VoLTE, or RCS.

The ME compares the indication against applications or capabilities that are supported by the ME.

In a second embodiment, the $EF_{AIDAPP}$ file may contain an ICSI or group of ICSI values that are associated with an application or capability of the device. In other embodiments, the $EF_{AIDAPP}$ may contain an IARI, APN, S-NSSAI or other similar values.

The $EF_{AIDAPP}$ file structure could be modified to support the above. For example, one change that may be made to 3GPP TS 31.102 or 31.103 is provided in APPENDIX A below.

Thus, the above shows one option for providing multiple IMS services on an ME having a plurality of ISIMs.

Selection of ISIM Based on Service Authentication

In a further embodiment, an ISIM is indicated to the ME by the network during an application level authentication and authorization. For example, the indication may be made by conveying one or more of an explicit field or an existing field as listed in the ISIM indications above, identifying the ISIM to use.

The ISIM indication is provided in a message from a service authentication and authorization network node such as Identity Management Server to the ME in response to a request for service authentication and authorization. The existing MC or MCX services make use of such a service authentication and authorization, for example using OpenID Connect. However, current procedures provide no indication of ISIM or IMS credentials for the ME to use. In other words, the ME merely uses the ISIM available to the ME from the UICC.

Figure 12:
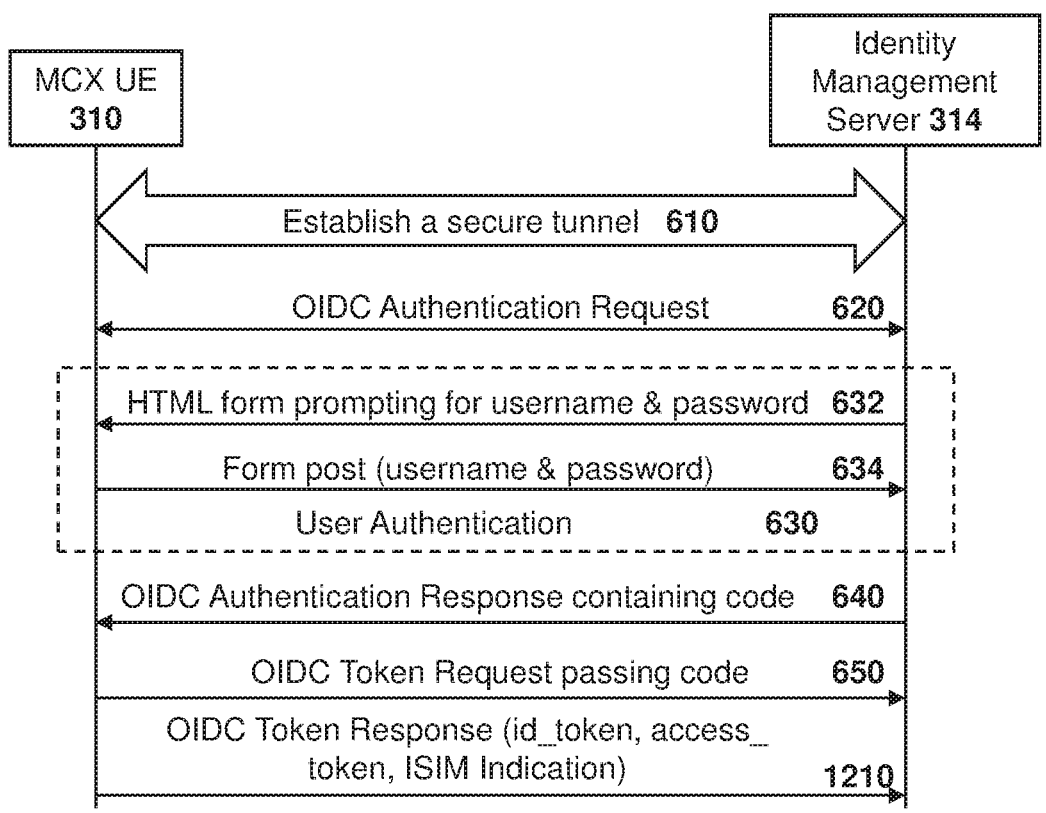
FIG. 12 is a dataflow diagram showing an OpenID connect flow for supporting MCX user authentication and further including an ISIM indication.

Therefore, in accordance with one embodiment of the present disclosure, an explicit indication may be provided. Reference is now made to FIG. 12.

The example of FIG. 12 is identical to the example of FIG. 6 above, with the exception of the Open ID Connect (OIDC) Token Response. Therefore, like numerals in FIGS. 6 and 12 have similar functionality.

With regards to OIDC Token Response message 1210, in the embodiment of FIG. 12 this message is where the ID and access tokens, as well as an ISIM indication, are provided to the MCX UE 310 by the Identity Management server 314.

The ISIM indication could, for example, be added to 3GPP TS 33.180 in subclause 5.1.2.3 as the bold text in Table 9 below. However, such changes are merely illustrative, and other changes could also be made.

TABLE 9

ISIM Indication in 3GPP TS 33.180

IdMS sends an OpenID Connect Token Response to the UE containing an ID token, an access token (each which uniquely identify the user of the MCX service) and an ISIM indication. The ID token is consumed by the UE to personalize the MCX client for the MCX user, the access token is used by the UE to communicate the identity of the MCX user to the MCX server(s), and the ISIM indication is used by the UE to select an ISIM/set of ISIM credentials/parameters to use when performing a subsequent IMS/SIP core registration

Thus, with the embodiment of FIG. 10, after reading and storing the information in the ME, if the MCPTT application determines it wants to authenticate with the network the ME may send a message to the network containing at least one of:

$1^{st}$ set of data that consist of at least one of
  0 to many ICCIDs
  0 to many AIDs
  0 to many User identities associated with either ICCID or AIDs Location of the UE, which can be Global Positioning System (GPS); Global Navigation Satellite System (GNSS); CellID; Timing Advance Index (TAI), Location Area Identifier (LAI), Routing Area Identifier (RAI), among others.

The message in response from the network may, for example, be implemented by changing the 3GPP Specifications. For example, Table 10 below shows a change that may be made with regards to clause 5.1.3.2.1 of 3GPP TS 33.180.

TABLE 10

Example change to 3GPP TS 33.180

5.1.3.2 MCX user service authorization with MCX Server
5.1.3.2.1 General
Depending on implementation, MCX user service authorization may be performed by sending the access token to the MCX server over the SIP-1 and SIP-2 reference points using either a SIP REGISTER message or a SIP PUBLISH message. Clause 5.1.3.2.2 describes how to use the SIP REGISTER message to transport the access token to the MCX server and clause 5.1.3.2.3 describes how to use the SIP PUBLISH message to transport the access token to the MCX server.
During initial SIP registration, the SIP REGISTER message shall not be delayed for lack of an access token. If an access token is not available then
SIP registration shall proceed without the inclusion of the access token and
the access token shall be transmitted to the MCX server as per Step C-3 in
FIG. 5.1.3.1-1. If an access token is received after the UE has sent a SIP REGISTER and the access token indicates to use a different Private User identity associated with a different UICC application that what was used for the initial SIP REGISTRATION then the UE shall deregister the Private User identity in the initial SIP REGISTRATION and re-register with the new Private User identity indicated by the access token.
If an access token is available before SIP registration, or if the UE becomes de-registered and a SIP re-registration is required, the SIP REGISTER message may include the access token without requiring the user to re-authenticate.
The access token may be sent over SIP to the MCX server to re-bind an TABLE 10-continued Example change to 3GPP TS 33.180

IMPU and MC service ID (MCPTT ID, MCVideo ID or MCData ID) if either have changed (e.g. IMPU is different due to SIP deregistration/ SIP re-registration, or user logs out and another user logs onto the same UE).

The addition, shown in bold in Table 10, provides that the ME needs to re-register if a different token is received than that originally used for a SIP REGISTRATION. However, such changes are merely illustrative, and other changes could also be made.

Further, during SIP REGISTER, a message from MCX UE to the SIP core may include the IMPI that was identified by the access token.

Table 11 below shows a structure for such message. Table 11 provides changes that may, for example, be made to 3GPP TS 33.180.

TABLE 11

Example change to 3GPP TS 33.180

B.1.1 ID token
B.1.1.0General
The ID Token shall be a JSON Web Token (JWT) and contain the following standard and MCX token claims. Token claims provide information pertaining to the authentication of the MCX user by the IdM server as well as additional claims. This clause profiles the required standard and MC claims for the MCX Connect profile.

B.1.1.3UICC claims
The UICC Connect profile extends the OpenID Connect standard claims with the additional claims shown in table B.1.1.3-1.
Table B.1.1.3-1: ID token UICC claims

| Parameter | Description |
| --- | --- |
| ICCID | Optional. This contains the ICCID obtained from EFICCID. Optionally if more than one UICC is present the ICCID from each UICC. |
| AID | Optional AID(s) obtained from EFDIR. Optionally if one if more than one UICC is present the AIDs from each UICC. |
| Private_User_Identity | Optional User identities from Application identified by the AID |

NOTE:
Each instance of the parameter shall be appended with a numeric value representing the next instance.
B.3.1.3 Token request
In order to exchange the authorization code for an ID token, access token and refresh token, the MCX client makes a request to the authorization server's token endpoint by sending the following parameters using the "application/x-www-form-urlencoded" format, with a character encoding of UTF-8 in the HTTP request entity-body. Note that client authentication is REQUIRED for native applications (using PKCE) in order to exchange the authorization code for an access token. Assuming that client secrets are used, the client secret is sent in the HTTP Authorization Header. The token request standard parameters are shown in table B.3.1.3-1.

Table B.3.1.3-1: Token Request standard required parameters

| Parameter | Values |
| --- | --- |
| grant_type | REQUIRED. The value shall be set to "authorization_code". |
| code | REQUIRED. The authorization code previously received from the IdM server as a result of the authorization request and subsequent successful authentication of the MCX user. |
| client_id | REQUIRED. The identifier of the client making the API request. It shall match the value that was previously registered with the OAuth Provider during the client registration phase of deployment, or as provisioned via a development portal. |
| redirect_uri | REQUIRED. The value shall be identical to the "redirect_uri" parameter included in the authorization request. |
| code_verifier | REQUIRED. A cryptographically random string that is used to correlate the authorization request to the token request. |
| ICCID (see NOTE) | Optional. This contains the ICCID obtained from $EF_{ICCID}$. Optionally if more than one UICC is present the ICCID from each UICC. |

TABLE 11-continued

Example change to 3GPP TS 33.180

| | |
|---|---|
| AID (see NOTE) | Optional AID(s) obtained from EFDIR. Optionally if one if more than one UICC is present the AIDs from each UICC. |
| Private_User_Identity | Optional User identities from Application identified by the AID |

NOTE:
Each instance of the parameter shall be appended with a numeric
value representing the next instance.
An example of a token request for MCX Connect might look like.
EXAMPLE:
POST /as/token.oauth2 HTTP/1.1
Host: IdM.server.com:9031
Cache-Control: no-cache
Content-Type: application/x-www-form-urlencoded
grant_type=authorization_code&code=SplxlOBeZQQYbYS6WxSbIA&client_id=
myNativeApp&code_verifier=0x123456789abcdef&redirect_uri=http://3gpp.mcptt
/cb&ICCID1=kkjgshfdjhr4t5345&AID(1)=lkjgslkjfdsgoi9w&Private_User_Id
=user@domain.net
B.3.1.4Token response
If the access token request is valid and authorized, the IdM server returns an ID
token, access token and refresh token to the MCX client; otherwise it will return an
error.
An example of a successful response might look like:
EXAMPLE:
HTTP/1.1 200 OK
    Content-Type: application/json;charset=UTF-8
    Cache-Control: no-store
    Pragma: no-cache
    {
"access_token":"eyJhbGciOiJSUzI1NiJ9.eyJtY3B0dF9pZCI6ImFsaWNlQG9yZy5j
b20iLCJleHAiOjE0NTM1MDYxMjEsInNjb3BlIjpbIm9wZW5pZCIsIjNncHA6bW
NwdHQ6cHR0X3NlcnZlciJdLCJjbGllbnRfaWQiOiJtY3B0dF9jbGllbnQifQ.XYIq
ai4YKSZCKRNMLipGC_5nV4BE79IJpvjexWjIqqcqiEx6AmHHIRo0mhcxeCESr
Xei9krom9e8Goxr_hgF3szvgbwl8JRbFuv97XgepDLjEq4jL3Cbu41Q9b0WdXAdF
meEbiB8wo_xggiGwv6IDR1b3TgAAsdjkRxSK4ctIKPaOJSRmM7MKMcKhIug3
BEkSC9-aXBTSIv5fAGN-ShDbPvHycBpjzKWXBvMIR5PaCg-
9fwjELXZXdRwz8C6JbRM8aqzhdt4CVhQ3-Arip-S9CKd0tu-
qhHfF2rvJDRlg8ZBiihdPH8mJs-qpTFep_1-kON3mL0_g54xVmlMwN0XQA",
 "refresh_token":"Y7NSzUJuS0Jp7G4SKpBKSOJVHIZxFbxqsqCIZhOEk9",
"id_token":"eyJhbGciOiJSUzI1NiJ9.eyJzdWIiOiIxMjM0NTY3ODkwIiwiYXVkIj
oibWNwdHRfY2xpZW50IiwiaXNzIjoiSWRNUy5zZXJ2ZXIuY29tOjkwMzEiLCJ
pYXQiOjE0NTM0OTgxNTgsImV4cCI6MTQ1MzQ5ODQ1OCwibWNwdHRfaW
QiOiJhbGljZUBvcmcuY29tIn0.Dpn7AhIMaqMEgg12NYUUfJGSFJMPG8M2li9F
LtPotDlHvwU2emBws8z5JLw81SXQnoLqZ8ZF8tIhZ1W7uuMbufF4Wsr7PAadZi
xz3CnV2wxFV9qR_VA1-
0ccDTPukUsRHsic0SgZ3aIbcYKd6VsehFe_GDwfqysYzD7yPwCfPZo",
"token_type": "Bearer",
"expires_in": 7199
}
The MCX client may now validate the user with the ID token and configure itself
for the user (e.g. by extracting the MC service ID from the ID Token). The MCX
client then uses the access token to make authorized requests to the MCX resource
servers (MCPTT server, MCVideo server, MCData server, KMS, etc.) on behalf of
the end user.
Annex C (informative):
OpenID connect detailed flow As seen in Table 11 above, changes are shown with bold, and add ICCID and AID parameters to the UICC claims. Further, parameters for a token request can include the ICCID and AID. However, such changes are merely illustrative, and other changes could also be made. Further, in various embodiments, multiple instances of the parameters of Table 11 may exist in messages and information flows described herein.

Figure 13:
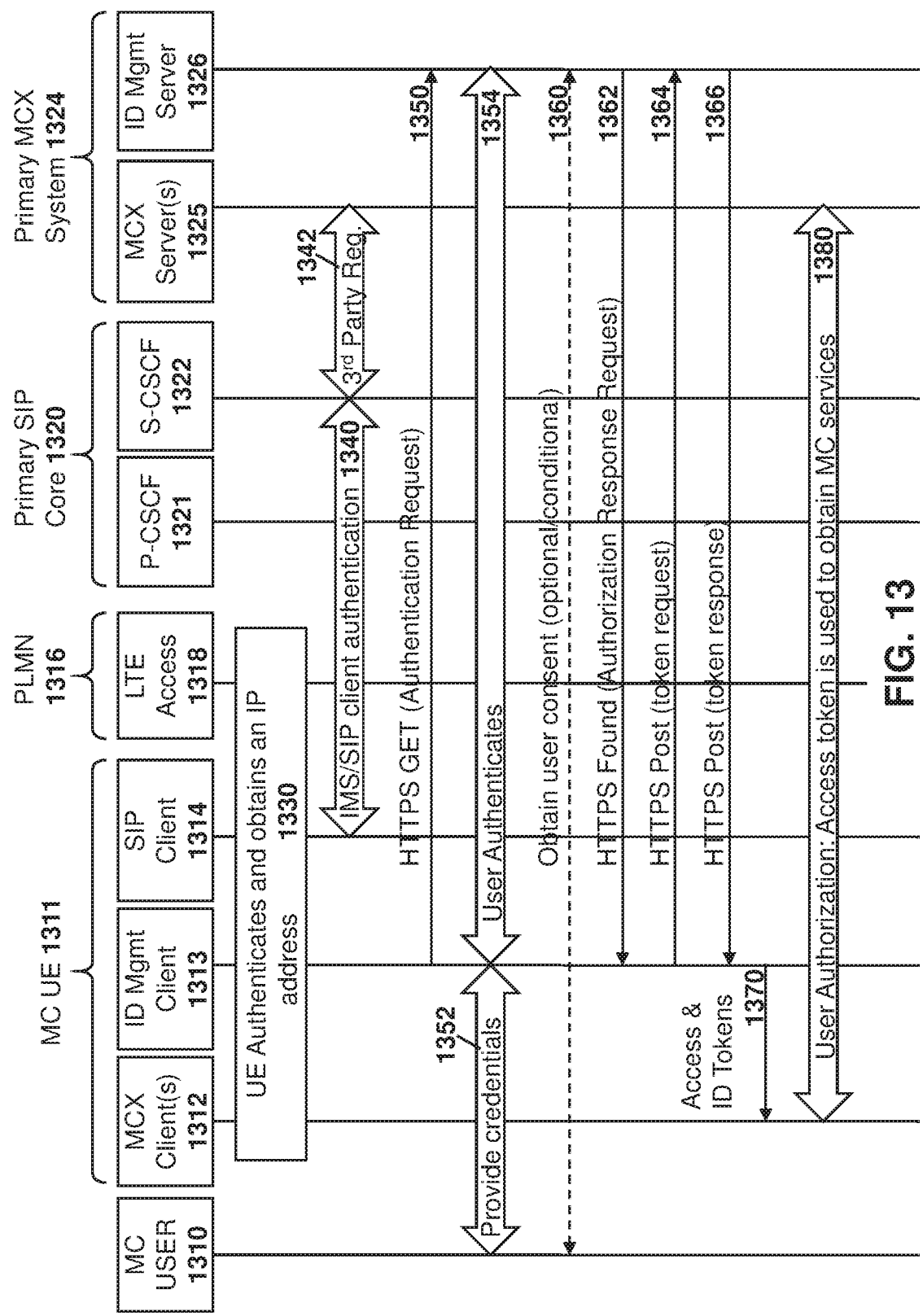
FIG. 13 is a dataflow diagram showing MC user authentication and registration from a user equipment.

Further, changes may be made to the flow for MC user authentication and registration. Reference is now made to FIG. 13.

In the embodiment of FIG. 13, an MC user 1310 wishes to obtain services using an MC UE 1311. MC UE 1311 comprises MCX Client(s) 1312, ID Management Client 1313, and a SIP Client 1314.

MC UE 1311 communicates via a PLMN 1316, which provides LTE Access 1318.

SIP functionality provided through a Primary SIP Core 1320 which comprises a P-CSCF 1321 and S-CSCF 1322. Primary SIP Core 1320 may provide IMS services, and in the embodiments described herein the terms may be used interchangeably.

The mission critical system is provided by Primary MCX System 1324 which includes MCX Server(s) 1325 and ID Management Server 1326.

The UE 1311 attaches to a network and establishes IP connectivity (e.g. via one or more PDN connections to one or more PDNs), as shown by block 1330. The UE may set up network security as defined, for example, in 3GPP TS 33.401. Further, a Primary SIP Core 1320 may be discovered, which includes a P-CSCF 1321 and S-CSCF 1322.

Subsequently, the UE IMS/SIP Client 1314 may authenticate with the primary IMS/SIP core 1320. This is, for example, shown by arrow 1340 in the embodiment of FIG. 13 and the authentication specifically occurs with S-SCSF 1322. The SIP Core 1320 sends a SIP third party registration, as shown by arrow 1342 to the MCX Application Server(s) 1325, notifying the servers of the MC UE SIP registration. The third party register message includes the registered IMPU and S-CSCF SIP URI or IP address.

The Identity Management client 1313 in UE 1311 issues an HTTPS authentication request to the OIDC based Identity Management server 1326 in the form of an HTTPS GET message 1350. The client includes a code-challenge value in this request.

Identity Management client 1313 may prompt MC user 1310 for credentials, which are provided as shown in arrow 1352. The MC user identity and associated credentials are then provided to the Identity Management server 1326 as shown by arrow 1354. The credentials are successfully authenticated and optionally authorized by the Identity Management Server 1326.

As part of either message 1350 or the authentication at arrow 1354, the UE may include information in the message sent to the Identity Management Server 1326. Such information may include, for example, the ICCID obtained from the $EF_{ICCID}$. If more than one UICC is present then the ICCID from each UICC may be provided in such messaging.

The message 1350 or authentication at arrow 1354 may further include the application identifiers obtained from the $EF_{DIR}$. Further, if more than one UICC is present, the AID(s) from each UICC may be provided.

Message 1350 or the user authentication at arrow 1354 may further provide user identities from the applications identified by the AID.

Further, the location of the UE or ME may be provided in such messaging. Such location may, for example, be found utilizing a GNSS system or the information may be derived from the serving PLMN when the UE is in the coverage of the 3GPP Radio Access Technology (RAT).

The Identity Management server 1326 may optionally request user consent for granting the MCX Client Access to MCX service in the MCX server, as shown by arrow 1360, by sending a message to the MCX client 1312. Upon receipt of the message, MCX client 1312 may present, using a user interface of the UE, an indication. Such indication may, for example, be a visual indication, audible indication or vibration indication, among other options. In response to the indication, an input may be received at the user equipment.

Subsequently, the Identity Management server 1326 may generate an authorization code that is associated with the code-challenge provided by the client. Identity Management server 1326 may send a browser redirect HTPP message with the authorization response containing the authorization code as response 1362.

At UE 1311, the Identity Management client 1313 performs an HTTPS Post 1364 to exchange the authorization code for an access token. In message 1364, the client includes the code-verifier string. This string is cryptographically associated with the code-challenge value provided in the authorization request of message 1350.

The Identity Management server 1326 verifies the Identity Management client 1313 based on the received code-verifier string and issues a response, e.g. 200 OK message, shown as arrow 1366 in the embodiment of FIG. 13. Message 1366 includes the access token and ID token that is specific to the MC user and MCX services included in it.

The ID token may contain a JSON web token claim containing at least one of an ICCID, AID, or user identity assigned by the Identity Management server 1326 that the UE should use to access a system. Such system could include, but is not limited to, MCPTT, RCS, carrier IMS, among other options.

The Identity Management server 1326 verifies the Identity Management client 1313 by calculating the code challenge from the received code-verifier string, and comparing it with the code-challenge value provided by the client in message 1350.

The access token and ID token provided in message 1366 are made available to the MCX client 1312, as shown with arrow 1370.

After this, the MC UE 1311 performs a registration and authentication with the system identified in message 1366 using the information received in the ID_token. Such information includes the application identified by the AID if an AID is received, or the user identity if the user identity is received. As will be appreciated by those skilled in the art, if the user identity is received, this implies that a specific AID/application is also used to access the system.

The SIP Core 1320 may send a SIP third party registration (not shown) to the MC Server notifying the MC Server of the MC UE 1311 SIP registration. The third party register message includes the registered IMPU and S-CSCF SIP URI or IP address and the JSON Web token claim for the access token.

Subsequently, the MC UE 1311 performs user MCX service authorization, shown by arrow 1380. Therefore, as seen in the embodiment of FIG. 13, UE 1311 may provide credentials from a plurality of ISIMs to an Identity Management server 1326 and may receive, in response, application identifiers for use with that information.

The above therefore provides an ME or UE with messaging to indicate which ISIM to use.

Use of multiple credentials within a single ISIM for authentication to multiple IMSs In accordance with a further embodiment of the present disclosure, instead of using multiple ISIMs, a single ISIM may be used with multiple identities.

In this embodiment, for each user identity stored in the ISIM there is one or both of an algorithm pointer provisioned and an application pointer.

When the ME selects the UICC application (e.g. ISIM) and accesses the data, the ME will determine which files or data within a file should be used with which application. Data may, for example include User Identity, among other similar data. Applications may include IMS applications such as VoLTE, ViLTE, VoWifi, RCS, MC/MCX services, MCPTT, MCVideo, MCData, among other options.

The ME performs a SIP Registration with the network using the user identities associated with the application that has triggered the SIP Registration. In response to the SIP Registration the ME will receive authentication vectors from the network and the ME sends the authentication vectors using the AUTHENTICATE command to the selected UICC application. The ME will also include the user identity that was included in the SIP Registration.

Upon receipt of the AUTHENTICATE command containing the authentication vectors and user identity, the ISIM application will send the authentication vectors to the authentication algorithm that was associated with the received user identity that was in the AUTHENTICATE command.

Figure 14:
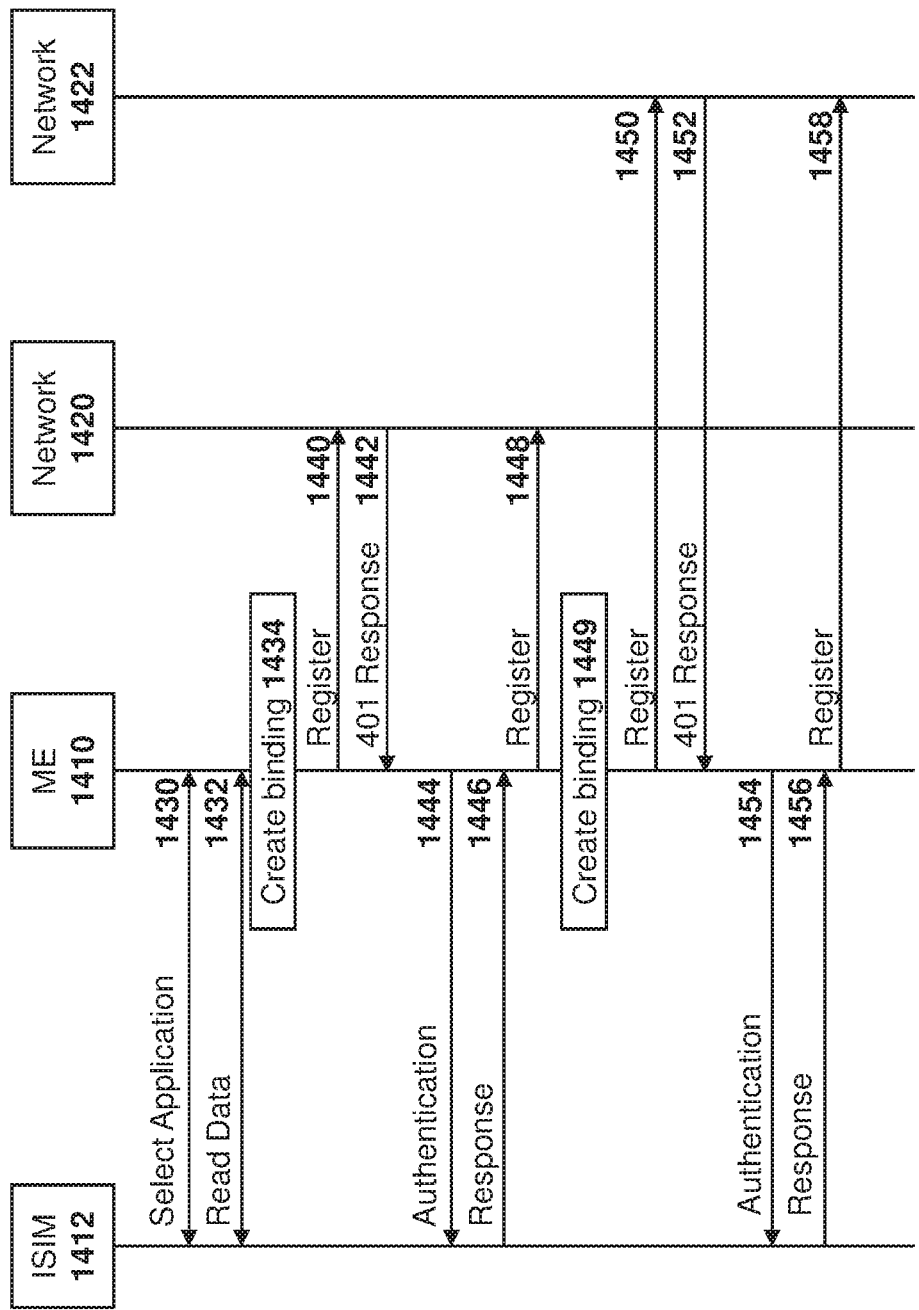
FIG. 14 is a dataflow diagram showing the registration of an ME for multiple IMS functions using a single ISIM having multiple credentials.

Therefore, reference is now made to FIG. 14. In the embodiment of FIG. 14, an ME 1410 reads a UICC application, shown as ISIM 1412. That application contains multiple sets of parameters such as algorithms, home domain names, IMPUs, among other options, that should be used for IMS/SIP core authentication purposes. The process of reading the UICC includes the ME determining which algorithm is associated with which user identity. For example, this may be done based on an existing $EF_{IMPI}$ file being extended to indicate an algorithm to use and what application the user identity (e.g. Network Access Identifier (NAI)) should be used for. Alternatively, the ME determines which algorithm is associated with which user identity using a new file that contains the NAI and algorithm to use for that NAI. The application to use can either be implicit through the name of the file or via an indication contained in the file.

The ME 1410 then sends a message to the network containing the NAI. Upon receipt of the authentication vectors, part of the authentication vectors along with either an algorithm to use or an NAI is sent to the UICC application.

Thus, referring again to FIG. 14, the ME 1410 may want IMS services from network 1420 or network 1422. Therefore, when initializing the UICC, e.g. when the ME is powered up, it may select a UICC application using a select command shown as message 1430 that contains the application identifier for the selected application.

The ME may then read the data, as shown by arrow 1432, from the selected application on the UICC and store the contents of the selected application on to the ME. An application on the ME then determines that it wants to register with a network for the selected function. For example, the selected function may be mission critical services.

The ME determines that the selected function is associated with an application by determining the application's $EF_{IMPI}$ or an Elementary File for the IMS private user identity for application Y ($EF_{IMPIY}$) contains the selected function.

A binding is created between the selected function and the application, shown by block 1434. The step of binding involves all SIP transactions that are associated with the private user identity in the $EF_{IMPI}$ or $EF_{IMPIY}$ that are associated with the application and this will result in the ME sending any necessary data to the application. Examples of such data include authentication responses or challenges, among other such data.

A function may include various functions including MCX services, VoLTE, RCS, among other options. The function may be identified by an ICSI, IARI, APN, among other identifiers.

In the embodiment of FIG. 14, the ME sends a registration message 1440, such as a SIP REGISTER request, to network 1420 containing at least one of a public user identity or a private user identity that were retrieved from, or stored on, the UICC application associated with the selected function. An indication of the algorithm may be also included.

In response to registration message 1440, the ME 1410 receives a 401 response in message 1442 containing an authentication challenge and vectors. The indication of the algorithm to use may also be included.

The ME 1410 may send some of the received data from message 1442 to the selected application (ISIM 1412) in message 1444 using a command defined for example in Appendix B below. For example, such command may be defined in Section 7.1.2.1 of Appendix B. The command contains either the user identifier as sent in the registration message 1440 or an algorithm that was either sent in message 1440 or received in response 1442 that is associated with the user ID. This association could also have been made when the ME read the $EF_{IMPI}$ or $EF_{IMPIY}$ files.

Based on the challenge, the ISIM 1412 returns a response 1446 which contains some of the authentication vectors.

The ME may then send a registration message 1448, which may, for example, be a second SIP REGISTER request, to network 1420 containing some of the data that was received in the response 1446.

Subsequently, an application on ME 1410 determines that it wants to register with a network for a second function, for example VoLTE. ME 1410 determines that the second function is associated with an application on ISIM 1412 by determining the $EF_{IMPI}$ or $EF_{IMPIY}$ on ISIM 1412 contains the second function in the $EF_{IMPI}$ or $EF_{IMPIY}$. A binding is created between the second function and ISIM 1412, as shown by block 1449. In the step of binding, all SIP transactions that are associated with the private user identity in the $EF_{IMPI}$ or $EF_{IMPIY}$ are associated with the ISIM 1412 and will result in the ME sending any necessary data to ISIM 1412 including authentication responses or challenges.

Subsequently, the ME sends a registration message 1450, such as a SIP REGISTER request, to network 1422. Registration message 1450 is similar to registration message 1440. In response, network 1422 sends a 401 response in message 1452 to ME 1410.

The ME 1410 may send some of the received data from message 1452 to the selected application (ISIM 1412) in message 1454 using a command defined for example in Appendix B below. For example, such command may be defined in Section 7.1.2.1 of Appendix B. The command contains either the user identifier as sent in the registration message 1450 or an algorithm that was either sent in message 1450 or received in response 1452 that is associated with the user ID. This association could also have been made when the ME read the $EF_{IMPI}$ or $EF_{IMPIY}$ files.

Based on the challenge, the ISIM 1412 returns a response 1456 which contains some of the authentication vectors.

The ME may then send a registration message 1458, which may, for example, be a second SIP REGISTER request, to network 1422 containing some of the data that was received in the response 1456.

Based on the above, a single ISIM may contain credentials from multiple services which may be distinguished based on identities, for example in the $EF_{IMPI}$ or $EF_{IMPIY}$.

The modules, mobile entities, and user equipments and devices described above may be any computing device or network node. Such computing device or network node may include any type of electronic device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 15:
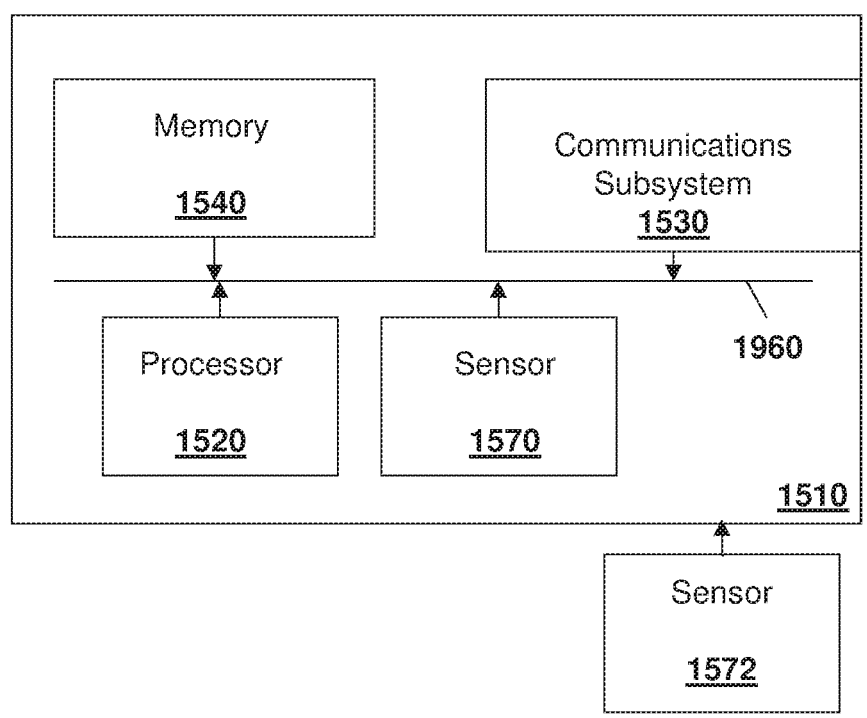
FIG. 15 is a block diagram showing a simplified computing device capable of being used with the embodiments of the present disclosure.

One simplified diagram of a computing device is shown with regard to FIG. 15. The computing device of FIG. 15 could be any UE, ME, or other node as described above.

In FIG. 15, device 1510 includes a processor 1520 and a communications subsystem 1530, where the processor 1520 and communications subsystem 1530 cooperate to perform the methods of the embodiments described above. Communications subsystem 1520 may, in some embodiments, comprise multiple subsystems, for example for different radio technologies.

Processor 1520 is configured to execute programmable logic, which may be stored, along with data, on device 1910, and shown in the example of FIG. 15 as memory 1540. Memory 1540 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1540, device 1510 may access data or programmable logic from an external storage medium, for example through communications subsystem 1530.

Communications subsystem 1530 allows device 1510 to communicate with other devices or network elements and may vary based on the type of communication being performed. Further, communications subsystem 1530 may comprise a plurality of communications technologies, including any wired or wireless communications technology.

Communications between the various elements of device 1510 may be through an internal bus 1560 in one embodiment. However, other forms of communication are possible.

Further, if the computing station is a mobile entity, one example mobile equipment is described below with regard to FIG. 16.

Mobile entity 1600 may comprise a two-way wireless communication device having voice or data communication capabilities or both. Mobile entity 1600 generally has the capability to communicate with other computer systems. Depending on the exact functionality provided, the mobile entity may be referred to as a data messaging device, a two-way pager, a wireless e-mail device, a smartphone, a cellular telephone with data messaging capabilities, a wireless Internet appliance, a wireless device, a mobile device, a user equipment, an embedded cellular modem or a data communication device, as examples.

Where mobile entity 1600 is enabled for two-way communication, it may incorporate a communication subsystem 1611, including a receiver 1612 and a transmitter 1614, as well as associated components such as one or more antenna elements 1616 and 1618, local oscillators (LOs) 1613, and a processing module such as a digital signal processor (DSP) 1620. As will be apparent to those skilled in the field of communications, the particular design of the communication subsystem 1611 will be dependent upon the communication network in which the mobile entity is intended to operate.

Network access requirements will also vary depending upon the type of network 1619. In some networks, network access is associated with a subscriber or user of the mobile entity 1600. A mobile entity may interact with an embedded or a removable user identity module (RUIM) or a subscriber identity module (SIM) card or a UMTS SIM (USIM) in order to operate on a network. The USIM/SIM/RUIM interface 1644 is normally similar to a card-slot into which a USIM/SIM/RUIM card can be inserted and ejected. The USIM/SIM/RUIM card can have memory and hold many key configurations 1651, and other information 1653 such as identification, and subscriber related information. In other cases, rather than a network 1619, mobile entity 1600 may communicate with a non-access node, such as a vehicle, roadside infrastructure, another mobile entity, or other peer-to-peer communication.

When required network registration or activation procedures have been completed, mobile entity 1600 may send and receive communication signals over the network 1619. As illustrated in FIG. 16, network 1619 can include multiple base stations communicating with the mobile entity.

Signals received by antenna 1616 through communication network 1619 are input to receiver 1612, which may perform such common receiver functions as signal amplification, frequency down conversion, filtering, channel selection and the like. Analog to digital (A/D) conversion of a received signal allows more complex communication functions such as demodulation and decoding to be performed in the DSP 1620. In a similar manner, signals to be transmitted are processed, including modulation and encoding for example, by DSP 1620 and input to transmitter 1614 for digital to analog (D/A) conversion, frequency up conversion, filtering, amplification and transmission over the communication network 1619 via antenna 1618. DSP 1620 not only processes communication signals, but also provides for receiver and transmitter control. For example, the gains applied to communication signals in receiver 1612 and transmitter 1614 may be adaptively controlled through automatic gain control algorithms implemented in DSP 1620.

Mobile entity 1600 generally includes a processor 1638 which controls the overall operation of the device. Communication functions, including data and voice communications, are performed through communication subsystem 1611. Processor 1638 also interacts with further device subsystems such as the display 1622, flash memory 1624, random access memory (RAM) 1626, auxiliary input/output (I/O) subsystems 1628, serial port 1630, one or more keyboards or keypads 1632, speaker 1634, microphone 1636, other communication subsystem 1640 such as a short-range communications subsystem or DSRC subsystem, and any other device subsystems generally designated as 1642. Serial port 1630 could include a USB port, On-Board Diagnostics (OBD) port or other port known to those in the art.

Figure 16:
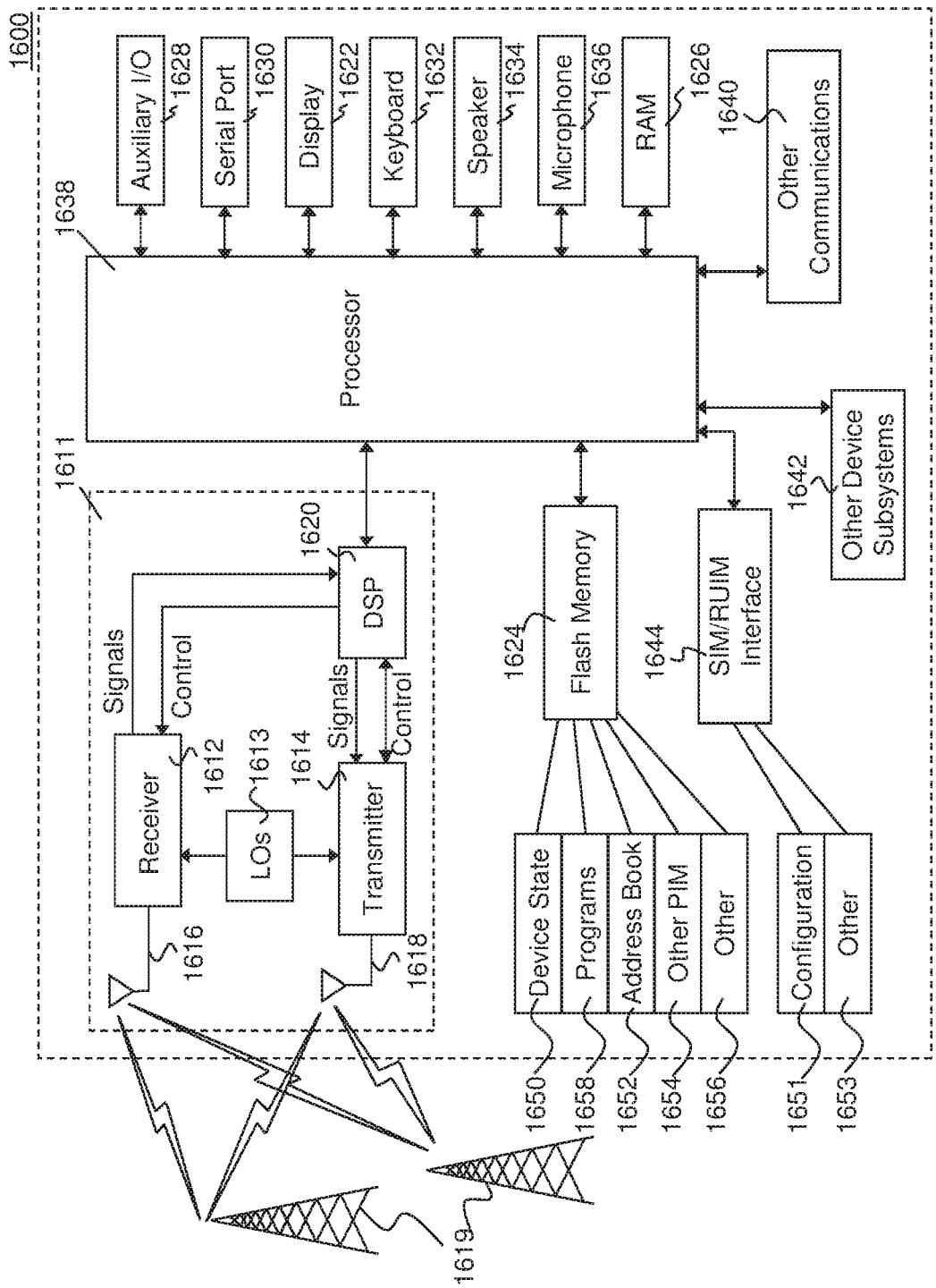
FIG. 16 is a block diagram showing an example mobile entity.

Some of the subsystems shown in FIG. 16 perform communication-related functions, whereas other subsystems may provide "resident" or on-device functions. Notably, some subsystems, such as keyboard 1632 and display 1622, for example, may be used for both communication-related functions, such as entering a text message for transmission over a communication network, and device-resident functions such as a calculator or task list.

Operating system software used by the processor 1638 may be stored in a persistent store such as flash memory 1624, which may instead be a read-only memory (ROM) or similar storage element (not shown). Those skilled in the art will appreciate that the operating system, specific device applications, or parts thereof, may be temporarily loaded into a volatile memory such as RAM 2026. Received communication signals may also be stored in RAM 1626.

As shown, flash memory 1624 can be segregated into different areas for both computer programs 1658 and program data storage 1650, 1652, 1654 and 1656. These different storage types indicate that each program can allocate a portion of flash memory 1624 for their own data storage requirements. Processor 1638, in addition to its operating system functions, may enable execution of software applications on the mobile entity. A predetermined set of applications that control basic operations, including potentially data and voice communication applications for example, will normally be installed on mobile entity 1600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile entity such as, but not limited to, e-mail, messages, calendar events, voice mails, appointments, and task items. Further applications, including productivity applications, social media applications, games, among others, may also be loaded onto the mobile entity 1600 through the network 1619, an auxiliary I/O subsystem 1628, serial port 1630, short-range communications subsystem 1640 or any other suitable subsystem 1642, and installed by a user in the RAM 1626 or a non-volatile store (not shown) for execution by the processor 1638. Such flexibility in application installation increases the functionality of the device and may provide enhanced on-device functions, communication-related functions, or both.

In a data communication mode, a received signal such as a text message or web page download will be processed by the communication subsystem 1611 and input to the processor 1638, which may further process the received signal for output to the display 1622, or alternatively to an auxiliary I/O device 1628.

A user of mobile entity 1600 may also compose data items such as messages for example, using the keyboard 1632, which may be a complete alphanumeric keyboard or telephone-type keypad, either physical or virtual, among others, in conjunction with the display 1622 and possibly an auxiliary I/O device 1628. Such composed items may then be transmitted over a communication network through the communication subsystem 1611.

Where voice communications are provided, overall operation of mobile entity 1600 is similar, except that received signals may typically be output to a speaker 1634 and signals for transmission may be generated by a microphone 1636. Alternative voice or audio I/O subsystems, such as a voice message recording subsystem, may also be implemented on mobile entity 1600. Although voice or audio signal output is preferably accomplished primarily through the speaker 1634, display 1622 may also be used to provide an indication of the identity of a calling party, the duration of a voice call, or other voice call related information for example.

Serial port 1630 in FIG. 16 may be implemented in a mobile entity for which synchronization with a user's desktop computer (not shown) may be desirable, but is an optional device component. Such a port 1630 may enable a user to set preferences through an external device or software application and may extend the capabilities of mobile entity 1600 by providing for information or software downloads to mobile entity 1600 other than through a wireless communication network. As will be appreciated by those skilled in the art, serial port 1630 can further be used to connect the mobile entity to a computer to act as a modem or for charging a battery on the mobile entity.

Other communications subsystems 1640, such as a short-range communications subsystem, is a further component which may provide for communication between mobile entity 1600 and different systems or devices, which need not necessarily be similar devices. For example, the subsystem 1640 may include an infrared device and associated circuits and components or a Bluetooth™ or Bluetooth™ Low Energy communication module to provide for communication with similarly enabled systems and devices. Subsystem 1640 may further include a WUR radio. Subsystem 1640 may further include a DSRC radio. Subsystem 1640 may further include non-cellular communications such as Wi-Fi or WiMAX, or near field communications, and in accordance with the embodiments above such radio may be capable of being split in some circumstances.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

APPENDIX A

| Changes to 3GPP TS 31.102/103 |
|---|

| 4.2.X $EF_{AIDAPP}$ (AID Application) This EF contains one or more purposes of the UICC application. | | |
|---|---|---|
| Identifier: '6FXX' | Structure: transparent | optional |
| SFI: 'XX' | | |
| File size: 1 bytes | Update activity: low | |
| Access Conditions: | | |

| READ | PIN |
|---|---|
| UPDATE | ADM |
| DEACTIVATE | ADM |
| ACTIVATE | ADM |

| Bytes | Description | M/O | Length |
|---|---|---|---|
| 1 | Application for AID | M | 1 |

| Application for AID Coding: | | | | | | | |
|---|---|---|---|---|---|---|---|
| b8 | b7 | b6 | b5 | b4 | b3 | b2 | b1 |
| | | | | | X | X | 0 | MCPTT |
| | | | | | X | X | 1 | VoLTE (HPLMN services) |
| | | | | | 0 | 0 | 1 | RCS |
| | | | | | 0 | 1 | 1 | RFU |
| | | | | | 1 | 1 | 1 | RFU |
| | | | | | | | | RFU (see TS 31.101) |

| 4.2.X $EF_{Slice}$ (Slice for Application) This EF contains the purpose of the AID. | | |
|---|---|---|
| Identifier: '6FXX' | Structure: transparent | optional |
| SFI: 'XX' | | |
| File size: 1 bytes | Update activity: low | |
| Access Conditions: | | |

| READ | PIN |
|---|---|
| UPDATE | ADM |
| DEACTIVATE | ADM |
| ACTIVATE | ADM |

| Bytes | Description | M/O | Length |
|---|---|---|---|
| 1 – X | SST | M | X |
| X + 1 to X + Y | SD | O | Y |

APPENDIX A-continued

Changes to 3GPP TS 31.102/103

4.2.X EF$_{AIDAPP}$ (AID Application)
This EF contains the purpose of the AID.

Identifier: '6Fxx'    Structure: transparent    optional
SFI: 'xx'
File size: X bytes    Update activity: low
Access Conditions:

| | |
|---|---|
| READ | PIN |
| UPDATE | ADM |
| DEACTIVATE | ADM |
| ACTIVATE | ADM |

| Bytes | Description | M/O | Length |
|---|---|---|---|
| X + 1 | Number of ICSIs | O | 1 |
| X + 2 | ICSI TLV Object | O | 1 |

ICSI TLV object:
Coding of the ICSI TLV objects

| Length | Description | Value | Status |
|---|---|---|---|
| 1 byte | ICSI TLV TAG | 'KK' | M |
| 1 byte | Length of ICSI | Y | M |
| Y bytes | ICSI value | — | M |

Alternative solution to encoding application into existing EF$_{IMPI}$ One will appreciate that a combination of the above and below could be implemented.
Contents:
The content and coding is defined below.
Coding:
IMS Communication Service Identifier: shall be coded as specified in TS 24.229.
Unused bytes shall be set to 'FF'.
Note:
The above to embodiments could be combined to have a single file that has an application ID and then a list of ICSI and or IARI's wherein the ICSI/IARI represent the capabilities that are supported with the general application type.
In the above is it also possible to append an APN field if required, this can be used by the ME if necessary to set-up the PDN connection to the data network for that application (e.g. VoLTE, MCPTT, RCS etc). See FIG. 17 for a possible way to encode APN.

APPENDIX B

Changes to 3GPP TS 31.102/103

4.2.2 EF$_{IMPI}$ (IMS private user identity)
This EF contains the private user identity of the user.

Identifier: '6F02'    Structure: transparent    Mandatory
SFI: '02'
File size: X bytes    Update activity: low
Access Conditions:

| | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 to X | NAI TLV data object | M | X bytes |
| X + 1 | Length of Algorithm byte | O | 1 |
| X + 2 | Algorithm to use for IMPI | O | 1 |
| X + 3 | Length of application byte | O | 1 |
| X + 4 | Application for IMPI | O | 1 |
| X + 5 to X + Y | Network Access Point | O | Y |

Algorithm to use for IMPI
Coding:

| b8 | b7 | b6 | b5 | b4 | b3 | b2 | b1 | |
|---|---|---|---|---|---|---|---|---|
| | | | | X | X | 0 | | Alogrithm 1 |
| | | | | X | X | 1 | | Alogrithm 2 |
| | | | | 0 | 0 | 1 | | Alogrithm 3 |
| | | | | 0 | 1 | 1 | | Alogrithm 4 |

APPENDIX B-continued

Changes to 3GPP TS 31.102/103

|  |  |  |  |  | 1 | 1 | 1 | Alogrithm 5 |
|---|---|---|---|---|---|---|---|---|
|  |  |  |  |  |  |  |  | RFU (see TS 31.101 [3]) |

Application for IMPI
Coding:

| b8 | b7 | b6 | b5 | b4 | b3 | b2 | b1 |  |
|----|----|----|----|----|----|----|----|---|
|    |    |    |    |    | X  | X  | 0  | MC services |
|    |    |    |    |    | X  | X  | 1  | VoLTE (HLPMN services) |
|    |    |    |    |    | 0  | 0  | 1  | RCS |
|    |    |    |    |    | 0  | 1  | 1  | ? |
|    |    |    |    |    | 1  | 1  | 1  | ? |
|    |    |    |    |    |    |    |    | RFU (see TS 31.101 [3]) |

4.2.X $EF_{IMPIY}$ (IMS private user identity for application Y)
This EF contains the private user identity of the user to use
for an alternative application Y.

Identifier: '6Fxx'   Structure: transparent   optional
SFI: 'xx'
File size: X bytes   Update activity: low
Access Conditions:

| READ | PIN |
|------|-----|
| UPDATE | ADM |
| DEACTIVATE | ADM |
| ACTIVATE | ADM |

| Bytes | Description | M/O | Length |
|-------|-------------|-----|--------|
| 1 to X | NAI TLV data object | M | X bytes |
| X + 1 | Length of Algorithm byte | O | 1 |
| X + 2 | Algorithm to use for IMPI | O | 1 |
| X + 3 to X + Y | Network Access Point | O | Y |

Algorithm to use for IMPI
Coding:

| b8 | b7 | b6 | b5 | b4 | b3 | b2 | b1 |  |
|----|----|----|----|----|----|----|----|---|
|    |    |    |    |    | X  | X  | 0  | Alogrithm 1 |
|    |    |    |    |    | X  | X  | 1  | Alogrithm 2 |
|    |    |    |    |    | 0  | 0  | 1  | Alogrithm 3 |
|    |    |    |    |    | 0  | 1  | 1  | Alogrithm 4 |
|    |    |    |    |    | 1  | 1  | 1  | Alogrithm 5 |
|    |    |    |    |    |    |    |    | RFU (see TS 31.101 [3]) |

| Byte(s) | Description | Length |
|---------|-------------|--------|
| 1 | Length of RAND (L1) | 1 |
| 2 to (L1 + 1) | RAND | L1 |
| (L1 + 2) | Length of AUTN (L2) | 1 |
| (L1 + 3) to (L1 + L2 + 2) | AUTN | L2 |
|  | Length of User ID | 1 |
|  | User ID | L3 |
| Alternative implementation |  |  |
|  | Length of Algorithm | 1 |
|  | Algorithm | L4 |

Network Access Point
Contains an APN that is used by the ME when using the NAI
Coding
See APN in 3GPP TS 23.003
Alternative solution to encoding application into existing $EF_{IMPI}$
One will appreciate that a combination of the above and below could be implemented.
Network Access Point
Contains an APN that is used by the ME when using the NAI
Coding
See APN in 3GPP TS 23.003
7.1.2.1 IMS AKA security context
The coding of AUTN is described in TS 33.102 [4]. The most significant bit of RAND is coded on bit 8 of byte 2. The most significant bit of AUTN is coded on bit 8 of byte (L1 + 3).
Response parameters/data, case 1, command successful:
The coding of the User ID is as described in section 4.2.2

The invention claimed is:

1. A method at a mobile entity for enabling use of multiple Internet Protocol (IP) Multimedia Services (IMS), the method comprising:
reading data from a plurality of IMS Subscriber Identity Modules (ISIMs) associated with the mobile entity;
storing the data at the mobile entity;
determining that an indication in the data for one of the plurality of ISIMs includes an indication for a function;
binding the function at the mobile entity to the one of the plurality of ISIMs, the binding comprising storing an application identifier in association with the one of the plurality of ISIMs; and
binding a second function at the mobile entity to a second one of the plurality of ISIMs;
wherein the indication is stored in an Application Identifier Application at the ISIM;
wherein the plurality of ISIMs are associated with a Universal Integrated Circuit Card (UICC) on the mobile entity;
wherein when a selected function is invoked, an ISIM bound to the selected function is used.

2. The method of claim 1, wherein the binding is based on provisioning of the data at each of the plurality of ISIMs to a plurality of functions.

3. The method of claim 1, wherein the indication is an explicit field in an IMS Subscriber Identity Module (ISIM).

4. The method of claim 1, wherein the indication is an IMS Communication Service Identifier.

5. The method of claim 1, wherein the indication is an IMS Application Reference Identifier.

6. The method of claim 1, wherein the indication is an Access Point Name.

7. A mobile entity for enabling use of multiple Internet Protocol (IP) Multimedia Services (IMS), the mobile entity comprising:
a processor; and
a communications subsystem,
wherein the mobile entity is configured to:
read data from a plurality of IMS Subscriber Identity Modules (ISIMs) associated with the mobile entity;
store the data at the mobile entity;
determine that an indication in the data for one of the plurality of ISIMs includes an indication for a function;
bind the function at the mobile entity to the one of the plurality of ISIMs, the binding comprising storing an application identifier in association with the one of the plurality of ISIMs; and
bind a second function at the mobile entity to a second one of the plurality of ISIMs;
wherein the indication is stored in an Application Identifier Application at the ISIM;
wherein the plurality of ISIMs are associated with a Universal Integrated Circuit Card (UICC) on the mobile entity;
wherein when a selected function is invoked, an ISIM bound to the selected function is used.

8. The mobile entity of claim 7, wherein the mobile entity is configured to bind based on provisioning of the data at each of the plurality of ISIMs to a plurality of functions.

9. The mobile entity of claim 7, wherein the indication is an explicit field in an IMS Subscriber Identity Module (ISIM).

10. The mobile entity of claim 7, wherein the indication is an IMS Communication Service Identifier.

11. The mobile entity of claim 7, wherein the indication is an IMS Application Reference Identifier.

12. The mobile entity of claim 7, wherein the indication is an Access Point Name.

13. A non-transitory computer readable medium for storing instruction code for enabling use of multiple Internet Protocol (IP) Multimedia Services (IMS), which, when executed by a processor of a mobile entity cause the mobile entity to:
read data from a plurality of IMS Subscriber Identity Modules (ISIMs) associated with the mobile entity;
store the data at the mobile entity;
determine that an indication in the data for one of the plurality of ISIMs includes an indication for a function;
bind the function at the mobile entity to the one of the plurality of ISIMs, the binding comprising storing an application identifier in association with the one of the plurality of ISIMs; and
bind a second function at the mobile entity to a second one of the plurality of ISIMs;
wherein the indication is stored in an Application Identifier Application at the ISIM;
wherein the plurality of ISIMs are associated with a Universal Integrated Circuit Card (UICC) on the mobile entity; and
wherein when a selected function is invoked, an ISIM bound to the selected function is used.

* * * * *

UNITED STATES PATENT AND TRADEMARK OFFICE
CERTIFICATE OF CORRECTION

| | |
|---|---|
| PATENT NO. | : 11,128,673 B2 |
| APPLICATION NO. | : 15/669656 |
| DATED | : September 21, 2021 |
| INVENTOR(S) | : Russell et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this
Twenty-second Day of November, 2022

*Katherine Kelly Vidal*

Katherine Kelly Vidal
*Director of the United States Patent and Trademark Office*